United States Patent
Kwon

(10) Patent No.: US 7,859,486 B2
(45) Date of Patent: Dec. 28, 2010

(54) AMBIENT LIGHT SENSING CIRCUIT AND FLAT PANEL DISPLAY INCLUDING AMBIENT LIGHT SENSING CIRCUIT

(75) Inventor: Ohkyong Kwon, Seoul (KR)

(73) Assignees: Samsung Mobile Display Co., Ltd., Suwon-si, Gyeonggi-do (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 343 days.

(21) Appl. No.: 12/003,440

(22) Filed: Dec. 26, 2007

(65) Prior Publication Data

US 2009/0015166 A1    Jan. 15, 2009

(30) Foreign Application Priority Data

| Dec. 27, 2006 | (KR) | ................ 10-2006-0135381 |
| Dec. 27, 2006 | (KR) | ................ 10-2006-0135382 |
| Dec. 27, 2006 | (KR) | ................ 10-2006-0135383 |
| Dec. 27, 2006 | (KR) | ................ 10-2006-0135384 |

(51) Int. Cl.
G09G 3/28 (2006.01)

(52) U.S. Cl. .................. 345/66; 345/207; 345/211; 345/212; 345/204

(58) Field of Classification Search ................ 345/207, 345/211–214, 204, 46, 44, 55, 66, 82, 92, 345/91, 99, 81, 102
See application file for complete search history.

(56) References Cited

U.S. PATENT DOCUMENTS

| 6,958,775 | B1 | 10/2005 | Shinotsuka et al. |
| 6,975,008 | B2 | 12/2005 | Cok |
| 7,095,392 | B2 | 8/2006 | Lin |
| 2002/0024378 | A1 | 2/2002 | Forbes et al. |
| 2006/0001624 | A1 | 1/2006 | Lee |
| 2006/0108511 | A1* | 5/2006 | Cok et al. ............... 250/214 R |
| 2006/0158542 | A1 | 7/2006 | Mizuno et al. |
| 2006/0227082 | A1 | 10/2006 | Ogata et al. |
| 2006/0273998 | A1* | 12/2006 | Young ......................... 345/81 |

FOREIGN PATENT DOCUMENTS

| CN | 1 713 254 A | 12/2005 |
| CN | 1 875 250 A | 12/2006 |
| DE | 100 65 887 A1 | 7/2001 |
| EP | 1 164 641 A | 12/2001 |
| EP | 1 589 518 A | 10/2005 |

(Continued)

*Primary Examiner*—Tuyet Thi Vo
(74) *Attorney, Agent, or Firm*—Lee & Morse, P.C.

(57) ABSTRACT

An ambient light sensing circuit includes a transistor, a first storage capacitor coupled to the transistor and adapted to compensate for a threshold voltage of the transistor, a second storage capacitor coupled to the first storage capacitor, a photodiode coupled to the first storage capacitor and the second storage capacitor and adapted to change a coupling voltage of the first and second storage capacitors based on ambient light incident thereon, a first switch adapted to selectively apply the first power supply voltage to the output load coupled to the transistor, and a second switch coupled to a first electrode of the transistor and the output load, and adapted to allow a charge stored in the storage capacitor to be discharged through the transistor based on the coupling voltage of the first storage capacitor and the second storage capacitor.

19 Claims, 12 Drawing Sheets

FOREIGN PATENT DOCUMENTS

| | | |
|---|---|---|
| JP | 08-101659 | 4/1996 |
| JP | 2001-109434 | 4/2001 |
| JP | 2004-233569 | 8/2004 |
| JP | 2004-273440 | 9/2004 |
| KR | 10-2000-0067627 A | 11/2000 |
| KR | 10-2003-0023972 A | 3/2003 |
| KR | 10-2005-0119559 A | 12/2005 |
| KR | 10-2006-0107345 A | 10/2006 |
| KR | 10-2006-0107525 A | 10/2006 |
| WO | WO 99/12148 A | 3/1999 |
| WO | WO 2006/123293 A | 11/2006 |

\* cited by examiner

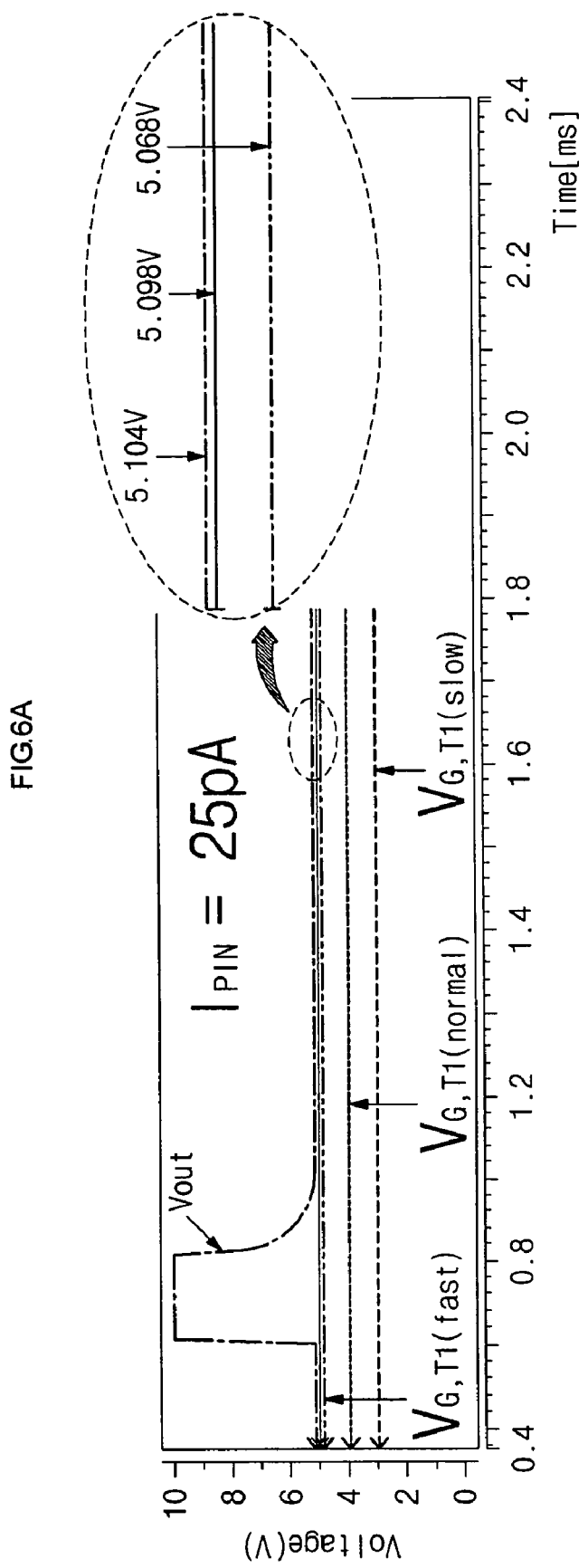

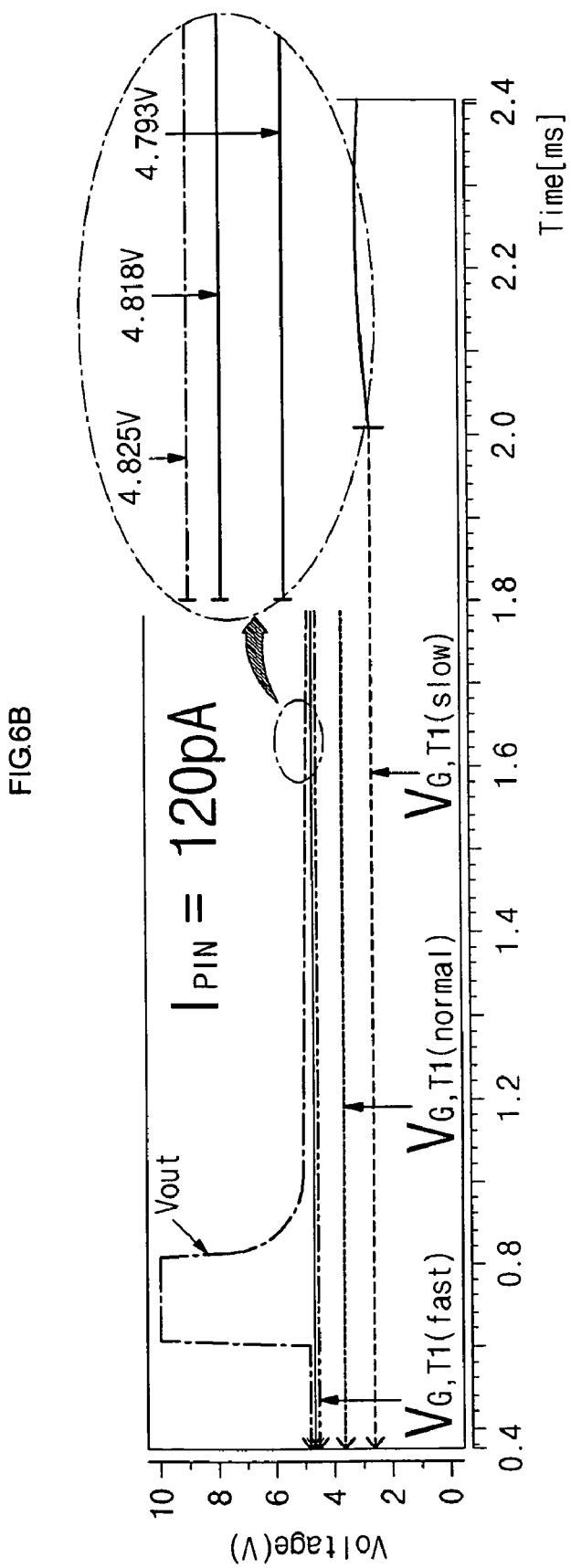

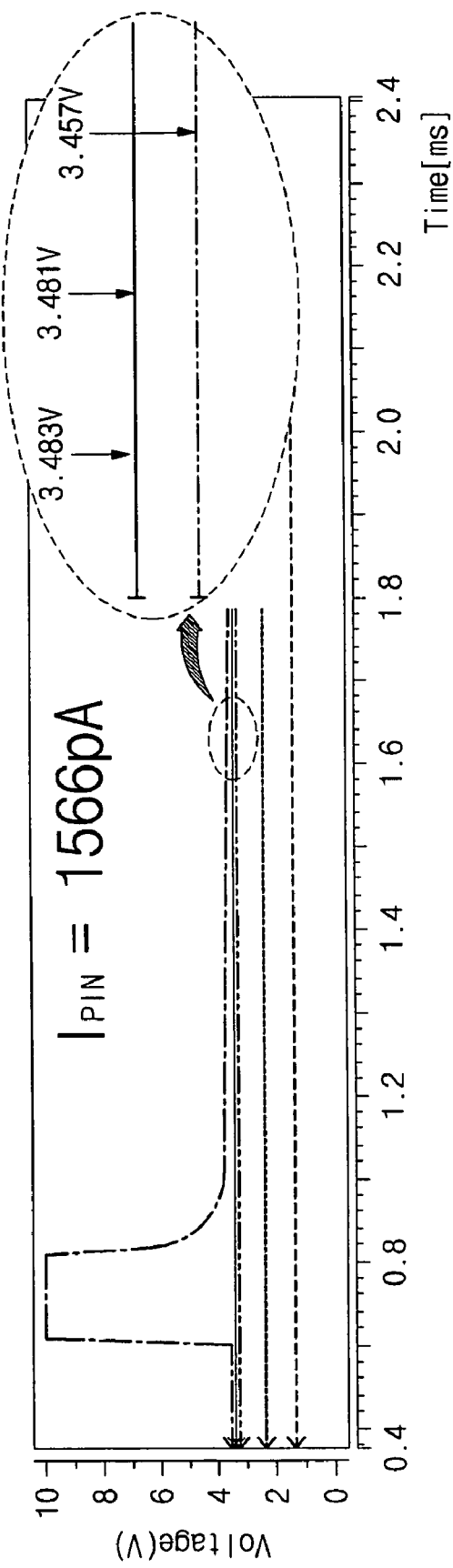

AMBIENT LIGHT SENSING CIRCUIT AND FLAT PANEL DISPLAY INCLUDING AMBIENT LIGHT SENSING CIRCUIT

CROSS REFERENCE TO RELATED APPLICATION

Cross reference is made to concurrently filed U.S. patent application Ser. No. 12/003,439 and titled "Ambient Light Sensing Circuit and Flat Panel Display Including Ambient Light Sensing Circuit."

BACKGROUND OF THE INVENTION

1. Field of the Invention

Embodiments relate to an ambient light sensing circuit and a flat panel display including such an ambient light sensing circuit.

2. Description of the Related Art

Flat panel displays include organic light emitting displays, liquid crystal displays, plasma displays and electric field emitting displays, etc. Such flat panel displays are relatively thinner, lighter and consume less power than conventional cathode ray tube (CRT) displays. Of the flat panel displays, organic light emitting displays and liquid crystal displays are generally more widely employed as displays for portable electronic devices because they are relatively easier to reduce in size and may be used with a battery for a relatively long time.

In general, screen brightness of flat panel displays, e.g., organic light emitting displays or liquid crystal displays, may be adjusted manually with user manipulation. However, they are generally designed to display a screen with constant brightness irrespective of ambient brightness. For example, typically, flat panel displays are designed to have optimum screen brightness in a room where ambient brightness is not high. Hence, screen brightness may be relatively too high in a dark place and may be relatively too low under sunlight. Therefore, there may be problems associated with visibility.

Further, because conventional flat panel displays may be designed to have constant screen brightness, when using such a flat panel display for a long time in a place where ambient brightness is relatively low, if screen brightness is not manually adjusted, screen brightness may be unnecessarily high and, as a result, power consumption may also be unnecessarily high.

Moreover, in conventional flat panel displays, a sensor, a processing circuit, etc., are formed on a different substrate from a main substrate on which a flat display panel is formed. Thus, if an ambient light sensing circuit for sensing ambient brightness is electrically coupled to the main substrate, size, thickness and amount of power consumption of the flat panel display may be increased.

SUMMARY OF THE INVENTION

Embodiments are therefore directed to ambient light sensing circuits and flat panel displays including such ambient light sensing circuits that substantially overcome one or more of the problems due to the limitations and disadvantages of the related art.

It is therefore a feature of an embodiment of the invention to provide an ambient light sensing circuit that can accurately sense ambient brightness.

It is therefore a separate feature of an embodiment of the invention to provide a flat panel display that may automatically adjust screen brightness in accordance with ambient brightness.

It is therefore a separate feature of an embodiment of the invention to provide an ambient light sensing circuit and a flat panel display including the same that may realize an ambient light sensing circuit, a signal processing circuit, etc., by a low temperature polycrystalline silicon thin film transistor on a substrate on which a pixel circuit is formed.

At least one of the above and other features and advantages of the invention may be realized by providing an ambient light sensing circuit adapted to be electrically coupled to a first power supply for supplying a first power supply voltage and an output load coupled to a storage capacitor, the ambient light sensing circuit including a transistor, a first storage capacitor coupled to the transistor and adapted to compensate for a threshold voltage of the transistor, a second storage capacitor coupled to the first storage capacitor, a photodiode coupled to the first storage capacitor and the second storage capacitor and adapted to change a coupling voltage of the first storage capacitor and the second storage capacitor based on ambient light incident thereon, a first switch adapted to selectively apply the first power supply voltage to the output load coupled to the transistor, and a second switch including a first electrode coupled to a first electrode of the transistor, and a second electrode coupled to the output load and a first electrode of the first switch and adapted to allow a charge stored in the storage capacitor to be discharged through the transistor based on the coupling voltage of the first storage capacitor and the second storage capacitor.

The ambient light sensing circuit may include a third switch including a first electrode coupled to a first electrode of the first storage capacitor and adapted to controllably supply a reference voltage to the first storage capacitor, and a fourth switch coupled to a second electrode of the first storage capacitor and between a control electrode of the transistor and a second electrode of the transistor, where the fourth switch may be adapted to allow an adjusted reference voltage based on the threshold voltage of the transistor to be applied to the second electrode of the first storage capacitor and to selectively connect the transistor in a diode-coupled state.

The ambient light sensing circuit may include a fifth switch coupled to the first electrode of the transistor and adapted to supply a reference voltage to the transistor, wherein the adjusted reference voltage may be based on the reference voltage supplied via the fifth switch and the threshold voltage of the transistor.

The ambient light sensing circuit may include a sixth switch coupled to a second electrode of the transistor and adapted to allow the storage capacitor coupled to the output load to be at least partially discharged to a second power supply based on the coupling voltage of the first storage capacitor and the second storage capacitor. The ambient light sensing circuit may include a third storage capacitor coupled to the photodiode and adapted to increase an inverse bias potential of the photodiode.

The ambient light sensing circuit may include a seventh switch arranged between the third storage capacitor and the photodiode and adapted to couple the third storage capacitor to the photodiode in parallel. The photodiode may be one of a PIN diode, a PN diode, and a photo coupler, in which a cathode thereof is coupled to a reference power supply and an anode thereof is coupled to a second power supply. The photodiode may be one of a PIN diode, a PN diode, and a photo coupler, in which a cathode thereof is coupled to a second power supply and an anode thereof is coupled to a reference power supply.

The first electrode of the transistor may be coupled to an ambient light control processor. The ambient light control processor may include an analog-digital converter that is electrically coupled with the first electrode of the transistor, a first memory that is electrically coupled with the analog-digital converter and stores a digital value in accordance with present ambient light, a controller that is electrically coupled with the first memory and calculates and outputs brightness of the present ambient light, and a second memory that is electrically coupled with the controller and has predetermined digital values corresponding to ambient light of various brightness levels stored therein.

The analog-digital converter may include the output load coupled to the transistor, and the storage capacitor coupled to the output load, wherein the storage capacitor is coupled between the output load and the second power supply. The storage capacitor coupled to the output load may be a parasitic wire capacitance.

At least one of the above and other features and advantages of the invention may be separately realized by providing a flat panel display including an ambient light sensing circuit adapted to be electrically coupled to a first power supply for supplying a first power supply voltage and an output load coupled to a storage capacitor, the ambient light sensing circuit including a transistor, a first storage capacitor coupled to the transistor and adapted to compensate for a threshold voltage of the transistor, a second storage capacitor coupled to the first storage capacitor, a photodiode coupled to the first storage capacitor and the second storage capacitor and adapted to change a coupling voltage of the first storage capacitor and the second storage capacitor based on ambient light incident thereon, a first switch adapted to selectively apply the first power supply voltage to the output load coupled to the transistor, and a second switch including a first electrode coupled to a first electrode of the transistor, and a second electrode coupled to the output load and a first electrode of the first switch and adapted to allow a charge stored in the storage capacitor to be discharged through the transistor based on the coupling voltage of the first storage capacitor and the second storage capacitor, an ambient light control processor coupled to the second electrode of the second switch of the ambient light sensing circuit, and adapted to calculate an amount of present ambient light based on an analog signal supplied from the first electrode of the transistor and to output a digital value corresponding to the amount of present ambient light, and a timing controller that outputs a control corresponding to the present ambient light based on the digital value output by the ambient light control processor.

The flat panel display may include a data driver that outputs a data signal corresponding to the present ambient light based on the control signal output by the timing controller, and an organic light emitting display panel that emits light based on the data signal output by the data driver. The data signal output by the data driver may be a data voltage that is proportional to the present ambient light sensed by the ambient light sensing circuit.

The timing controller may include a lookup table including predetermined digital values corresponding to ambient light of various brightness levels stored therein, and a brightness selector that compares the digital value output by the ambient light control processor with the predetermined digital values stored in the lookup table, selects a control signal corresponding to the present ambient light, and outputs the control signal corresponding to the present ambient light.

The flat panel display may include an emission control driver that outputs a light emission control signal corresponding to the present ambient light based on the control signal output by the timing controller, and an organic light emitting display panel that emits light based on the light emission control signal output by the light emission control driver.

The light emission control signal output by the light emission control driver may control an on-time of a light emission control signal supplied to the organic light emitting display panel, and the on-time of the light emission control signal is proportional to the present ambient light sensed by the ambient light sensing circuit. The flat panel display may further include a power supply controller that outputs a power supply voltage corresponding to the present ambient light based on the control signal output by the timing controller, and an organic light emitting display panel that emits light based on the power supply voltage output by the power supply controller.

The flat panel display may further include a buffer that boosts and outputs a power supply voltage corresponding to the present ambient light based on the control signal output by the timing controller, a backlight that is lighted by a voltage supplied from the buffer, and a liquid crystal display panel that displays an image using light emitted from the backlight.

BRIEF DESCRIPTION OF THE DRAWINGS

The above and other features and advantages of the present invention will become more apparent to those of ordinary skill in the art by describing in detail exemplary embodiments thereof with reference to the attached drawings, in which:

FIGS. 6A, 6B, 6C illustrate simulated graphs of changes in output voltage relative to changes in ambient light as determined by the ambient light sensing circuit of FIG. 1A;

DETAILED DESCRIPTION OF THE INVENTION

Figure 1A:
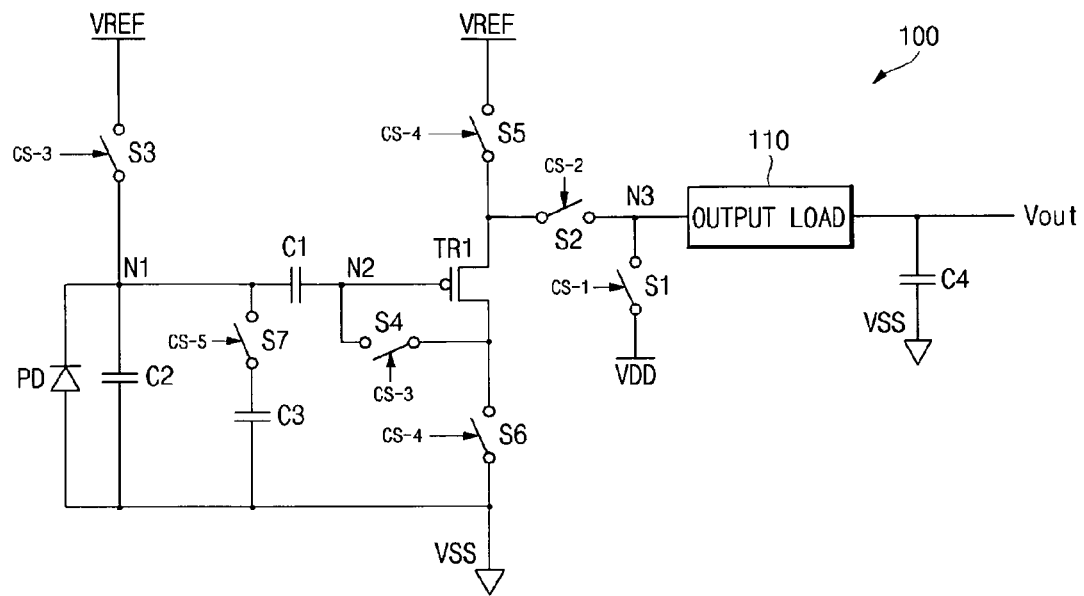
FIGS. 1A and 1B illustrate circuit diagrams of exemplary ambient light sensing circuits according to aspects of the present invention.

Korean Patent Application Nos. 10-2006-0135381, 10-2006-0135382, 10-2006-0135383, 10-2006-0135384 filed on Dec. 27, 2006, in the Korean Intellectual Property Office, and entitled: "Ambient Light Sensing Circuit and Flat Panel Display Having the Same," are incorporated by reference herein in their entirety.

Embodiments of the invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions may be exaggerated for clarity of illustration.

It will be understood that when an element is referred to as being "coupled" to another element, it can be directly coupled to the other element or intervening elements may be present. In contrast, when an element is referred to as being "directly coupled," there are no intervening elements present. Like reference numerals refer to like elements throughout the specification.

Figure 1B:
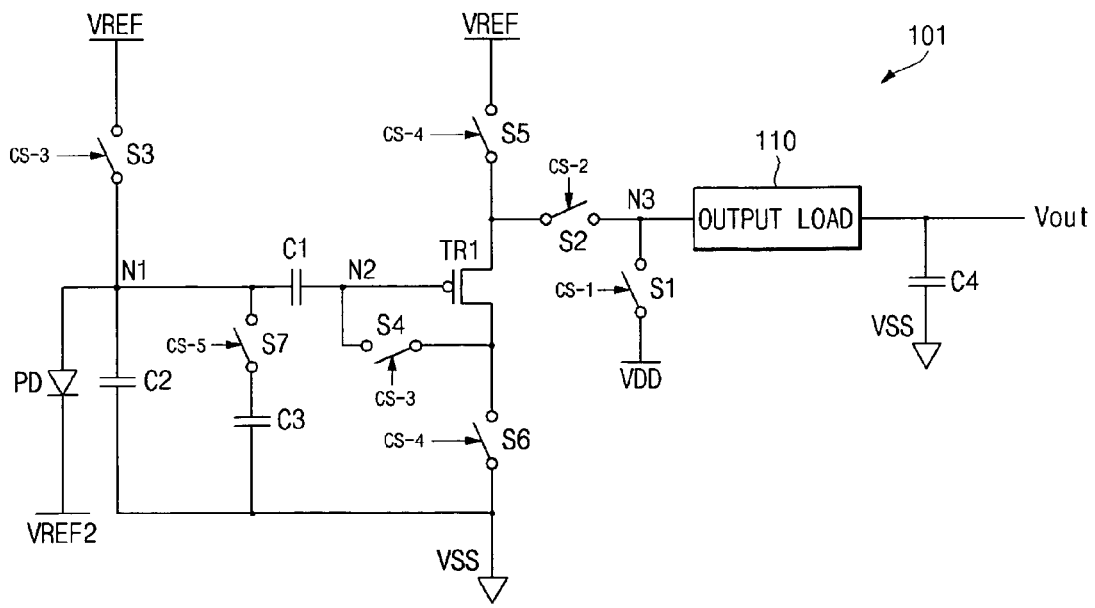

FIGS. 1A and 1B illustrate circuit diagrams of exemplary ambient light sensing circuits 100, 101 according to aspects of the present invention.

As illustrated in FIG. 1A, the ambient light sensing circuit 100 may include a transistor TR1, a first storage capacitor C1, a second storage capacitor C2, a third storage capacitor C3, a photodiode PD, a first switch S1, a second switch S2, a third switch S3, a fourth switch S4, a fifth switch S5, a sixth switch S6, and a seventh switch S7.

The transistor TR1 may include a first electrode (source or drain), a second electrode (drain or source) and a control electrode (gate electrode). The transistor TR1 may be, e.g., a polysilicon thin film transistor, an amorphous silicon thin film transistor, an organic thin film transistor and equivalents thereof, but embodiments of the invention are not limited by a kind or a material(s) of the transistor TR1.

If the transistor TR1 is a polysilicon thin film transistor, the transistor TR1 may be formed using, e.g., a laser crystallization method, a metal induction crystallization method, a high pressure annealing method, etc., but embodiments of the present invention are not limited by the fabricating method of the polysilicon thin film transistor.

For reference, laser crystallization is a method in which crystallization is realized by illuminating, e.g., an excimer laser on an amorphous silicon. Metal induced crystallization is a method is a method in which crystallization starts from a metal positioned, e.g., on an amorphous silicon, and then heating the silicon at a predetermined temperature, and high pressure annealing is a method in which annealing is executed by applying, e.g., a predetermined pressure on polysilicon.

Further, any or all of the transistor TR1 and the first through seventh switches S1, S2, S3, S4, S5, S6, S7 may be, e.g., a P-channel transistor, an N-channel transistor, etc., but are not limited thereto. In some embodiments, the transistor TR1 and the first through seventh switches S1, S2, S3, S4, S5, S6, S7 may all be of a same type, e.g. P-type or N-type, or may be of different types, e.g., combination of P-type and N-type. In the following description, the transistor TR1 is a P-channel transistor TR1, but embodiments of the invention are not limited thereto. More particularly, e.g., one, some or all of the transistor TR1 and the first through seventh switches S1, S2, S3, S4, S5, S6, S7 may be, e.g., a P-channel low temperature polycrystalline silicon transistor, etc., but embodiments of the invention are not limited thereto. It is understood by those of ordinary skill in the art that a description of states of control signals supplied depends on a type of a transistor employed for respective elements, e.g., each of the first through seventh switches S1, S2, S3, S4, S5, S6, and S7. Therefore, if, e.g., a different transistor type is used, a different or opposite state of a respective control signal may be supplied thereto while achieving a desired result, e.g., output voltage Vout corresponding to sensed ambient light, of aspects of the invention.

The first storage capacitor C1 may be coupled to the transistor TR1, and may compensate for a threshold voltage of the transistor TR1. A first electrode of the first storage capacitor C1 may be coupled to a first node N1, corresponding to a contact node between a cathode of the photodiode PD, a first electrode of the third switch S3, a second electrode of the seventh switch S7 and a first electrode of the second storage capacitor C2, and a second electrode of the first storage capacitor C1 may be coupled to a second node N2, corresponding to a contact node between a control electrode of the transistor TR1 and a second electrode the fourth switch S4. If the transistor TR1 is, e.g., a low temperature polycrystalline silicon thin film transistors (LTPS-TFTs) formed using, e.g., an excimer laser annealing (ELA) method, electrical properties of the transistor TR1, such as threshold voltage Vth, may not be uniform as a result of energy differences of the excimer laser. The first storage capacitor C1 may compensate for such threshold voltage variations. The compensating operation of the first storage capacitor C1 will be explained in detail below.

The second storage capacitor C2 may improve signal maintenance characteristics by increasing an inverse bias potential of the photodiode PD. This operation will be explained in more detail below. The first electrode of the second storage capacitor C2 may be coupled to cathode of the photodiode PD, i.e., the first node N1, and a second electrode of the second storage capacitor C2 may be coupled to an anode of the photodiode PD, corresponding to a second power supply VSS.

A first electrode of the third storage capacitor C3 may be coupled to the anode the photodiode PD and the second power supply VSS, and a second electrode of the third storage capacitor C3 may be coupled to a second electrode of the seventh switch S7 such that when the seventh switch S7 is on, the photodiode PD, the second storage capacitor C2 and the third storage capacitor C3 may be connected in parallel. The third storage capacitor C3 may improve signal maintenance characteristics by increasing an inverse bias potential when a relatively high amount of ambient light is suddenly incident on the photodiode PD. This operation will be explained in more detail below.

The second storage capacitor C2 may be discharged to a predetermined voltage by allowing a constant current to flow in response to ambient light incident on the photodiode PD.

The photodiode PD may be, e.g., a positive-intrinsic-negative PIN diode, a pn junction PN diode, a photocoupler, equivalents thereof, etc. The cathode of the photodiode PD may be coupled to the first node N1 between the first storage capacitor C1 and the third switch S3, and the anode of the photodiode PD is coupled to the second power supply VSS. Embodiments of the invention are not limited by the kind and the material(s) of the photodiode PD.

The first switch S1 may supply a voltage of a first power supply VDD to an output load 110, and may charge a fourth storage capacitor C4 coupled to the output load 110. The output load 110 may be, e.g., an internal load of an analog-digital converter. The fourth storage capacitor C4 may be, e.g., a parasitic capacitance of a wire.

A first electrode of the first switch S1 may be coupled to the first power supply VDD and a second electrode of the first switch S1 may be coupled to a third node N3, corresponding to a contact node between a second electrode of the second switch S2 and a first terminal of the output load 110. A first control signal CS-1 may be applied to a control electrode of the first switch S1.

The second switch S2 may be coupled between a first electrode of the transistor TR1 and the output load 110. More particularly, e.g., a first electrode of the second switch S2 may be coupled to the first electrode of the transistor TR1, and a second electrode of the second switch S2 may be coupled to the third node N3, corresponding to the output load 110. The second switch S2 may enable the fourth storage capacitor C4 coupled to the output load 110 to be discharged to the second power supply VSS via the transistor TR1 based on a coupling voltage of the first storage capacitor C1 and the second storage capacitor C2. That is, because the second switch S2 may be coupled to the output load 110, it may enable the fourth storage capacitor C4 that may be charged with the first power supply VDD to be discharged to the second power supply VSS via the transistor TR1. A second control signal CS-2 may be applied to a control electrode of the second switch S2.

A first electrode of the third switch S3 may be coupled to the first node N1 including the first electrode of the first storage capacitor C1, the second storage capacitor, and the cathode of the photodiode PD. A second electrode of the third switch S2 may be coupled to a reference power supply VREF. A third control signal CS-3 may be applied to a control electrode of the third switch S3. A reference voltage of the reference power supply VREF may be applied to the first electrode of the first storage capacitor C1.

The third control signal CS-3 may also be applied to a control electrode of the fourth switch S4. a first electrode of the fourth switch S4 may be coupled to a second electrode of the transistor TR1 and a second electrode of the sixth switch S6. When the fourth switch S4 is closed, the control electrode and the second electrode of the transistor TR1 may be coupled such that the transistor TR1 may be in a diode-coupled state. The second electrode of the fourth switch S4 may be coupled to the second node N2. The fourth switch S4 may apply the reference voltage less a threshold voltage of the transistor TR1 to the first storage capacitor C1 when the transistor TR1 is in the diode-coupled state.

The fifth switch S5 may apply the reference voltage of the reference power supply to the first electrode of the transistor TR1. Thus, the reference voltage less the threshold voltage may be applied to the second node N2 via the transistor TR1 and the fourth switch S4. More particularly, a first electrode of the fifth switch S5 may be coupled to the first electrode of the transistor TR1, and a second electrode of the fifth switch S5 may be coupled to the reference power supply VREF. A fourth control signal CS-4 may be applied to a control electrode of the fifth switch S5. The sixth switch S6 may enable a voltage charged in the fourth capacitor C4 to be discharged to the second power supply VSS and to converge to a predetermined voltage in response to the coupling voltage of the first storage capacitor C1 and the second storage capacitor. A first electrode of the sixth switch S6 may be coupled to the second power supply VSS and a second electrode of the sixth switch S6 may be coupled to the second electrode of the transistor TR1. The fourth control signal CS-4 may be applied to a control electrode of the sixth switch S6.

The seventh switch S7 may be coupled between the photodiode PD and the third storage capacitor C3 and may enable the third storage capacitor C3 to be coupled to the photodiode PD. A first electrode of the seventh switch S7 may be coupled to a first electrode of the third storage capacitor C3, and a second electrode of the seventh switch S7 may be coupled to the photodiode PD, i.e., the first node N1. A fifth control signal CS-5 may be applied to a control electrode of the seventh switch S7.

The reference power supply VREF coupled to the third switch S3 and the reference power supply VREF coupled to the fifth switch S5 may have the same voltage or different voltages. A voltage of the reference power supply VREF coupled to the fifth switch S5 may be such that a voltage produced by subtracting a threshold voltage Vth of the transistor TR1 therefrom is larger than the voltage of the second power supply VSS. While the ambient light sensing circuit 101 is illustrated with specific components and a specific coupling scheme in FIG. 1A, embodiments of the invention are not limited thereto.

For example, referring now to the second exemplary embodiment of the ambient light sensing circuit 101, in some embodiments, the same components as those illustrated in FIG. 1A may be employed with a different coupling scheme. In general, only differences between the first exemplary ambient light sensing circuit 100 shown in FIG. 1A and the second exemplary ambient light sensing circuit 101 shown in FIG. 1B will be described below.

More particularly, e.g., in the ambient light sensing circuit 101, a different coupling scheme for a photodiode PD' may be employed relative to the coupling scheme of the exemplary ambient light sensing circuit 100 illustrated in FIG. 1A. That is, as shown in FIG. 1B, an anode of the photodiode PD' may be coupled to the reference power supply VREF via the first node N1 and the third switch S3 and a cathode of the photodiode PD' may be coupled to a second reference power supply VREF2.

Referring to FIGS. 1A and 1B, when a reverse current flows through the photodiode PD of the first exemplary ambient light sensing circuit 100, the second storage capacitor C2 is discharged, and when a reverse current flows through the photodiode PD' of the second exemplary ambient light sensing circuit 100', the second storage capacitor C2 is charged. Accordingly, the higher a reverse current flowing through the photodiode PD of the ambient light sensing circuit 100, the lower a coupling voltage produced by the first storage capacitor C1 and the second storage capacitor C2. However, the higher a reverse current flowing through the photodiode PD' of the ambient light sensing circuit 101, the higher a coupling voltage produced by the first storage capacitor C1 and the second storage capacitor C2. Thus, in the exemplary light sensing circuit 101 shown in FIG. 1B, a voltage of the second reference power supply VREF2 coupled to the photodiode PD' may be larger than that of the reference power supply VREF coupled to the third switch S3.

Figure 2:
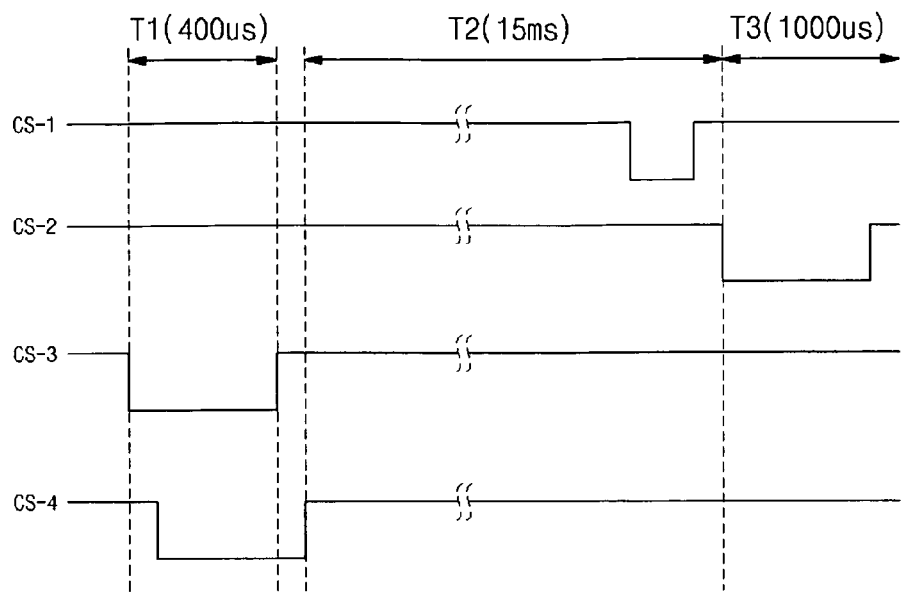
FIG. 2 illustrates an exemplary timing diagram of an ambient light sensing circuit according to aspects of the present invention.

FIG. 2 illustrates an exemplary timing diagram of an ambient light sensing circuit according to aspects of the present invention.

Referring to FIG. 2, the ambient light sensing circuit 100 may operate with a period of approximately 16.7 ms, i.e., a period of one frame when a flat panel display outputs one screen. A flat panel display employing, e.g., the ambient light sensing circuit 100, may automatically adjust brightness of a screen rapidly in response to ambient brightness. Such an operating period of the ambient light sensing circuit 100 is merely an example and may be set to various operation periods.

Operation of the ambient light sensing circuit 100 may include, e.g., a threshold voltage compensating period T1, an ambient light sensing period T2 and a sampling period T3. The threshold voltage compensating period T1 may be, e.g., approximately 400 μs. The ambient light sensing period T2 may be, e.g., approximately 15 ms. The sampling period T3 may be, e.g., approximately 1000 μs. A threshold voltage compensating process may be performed during the threshold voltage compensating period T1. An ambient light sensing process may be performed during the ambient light sensing period T2. A sampling process may be performed during the sampling period T3. To perform the threshold voltage compensating process, the ambient light sensing process and the sampling process, four control signals, e.g., the first control signal CS-1, the second control signal CS-2, the third control signal CS-3 and the fourth control signal CS-4 may be applied to the ambient light sensing circuit 100.

Referring to FIG. 2, the ambient light sensing circuit 100 may perform the ambient light sensing process during the period T2, i.e., the longest period. Thus, an ambient light sensing accuracy may be improved.

Further, in some embodiments of the invention, when the ambient light is relatively bright, the fifth control signal CS-5 (not shown in FIG. 2) may be applied to the ambient light sensing circuit 100. More particularly, the fifth control signal CS-5 may be applied to the seventh switch S7. The fifth control signal CS-5 will be described below.

Operation of the exemplary ambient light sensing circuit 100 will been explained with reference to FIGS. 1A and 2-5. Note that according to embodiments, the sixth switch S6 may be of a different type than the fifth switch S5 to which the fourth control signal CS-4 may also be supplied, such that when the fifth switch S5 is in an "on" state, the sixth switch S6 is in an "off" state, and vice versa. For example, if the fifth switch S5 is a P-type low temperature polycrystalline silicon transistor, it may be turned off when the fourth control signal CS-4 at a high level is applied to the control electrode thereof. At the same time, if the sixth switch S6 is an N-type low temperature polycrystalline silicon transistor, it may be turned on when the fourth control signal CS-4 at a high level is applied to the control electrode thereof.

Figure 3:
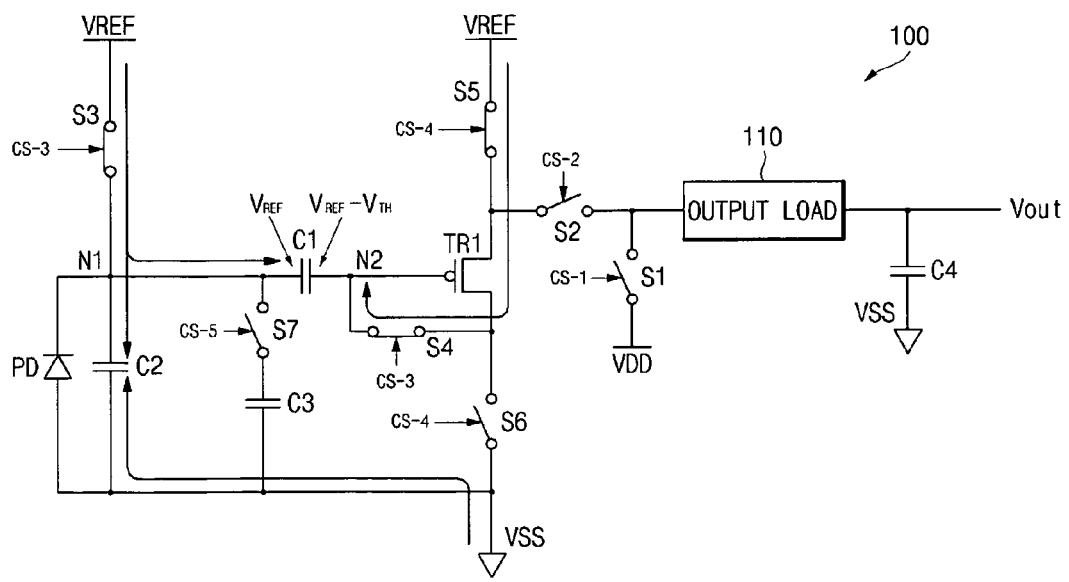
FIG. 3 illustrates a current path during a threshold voltage compensating period of the ambient light sensing circuit of FIG. 1A.
Figure 4:
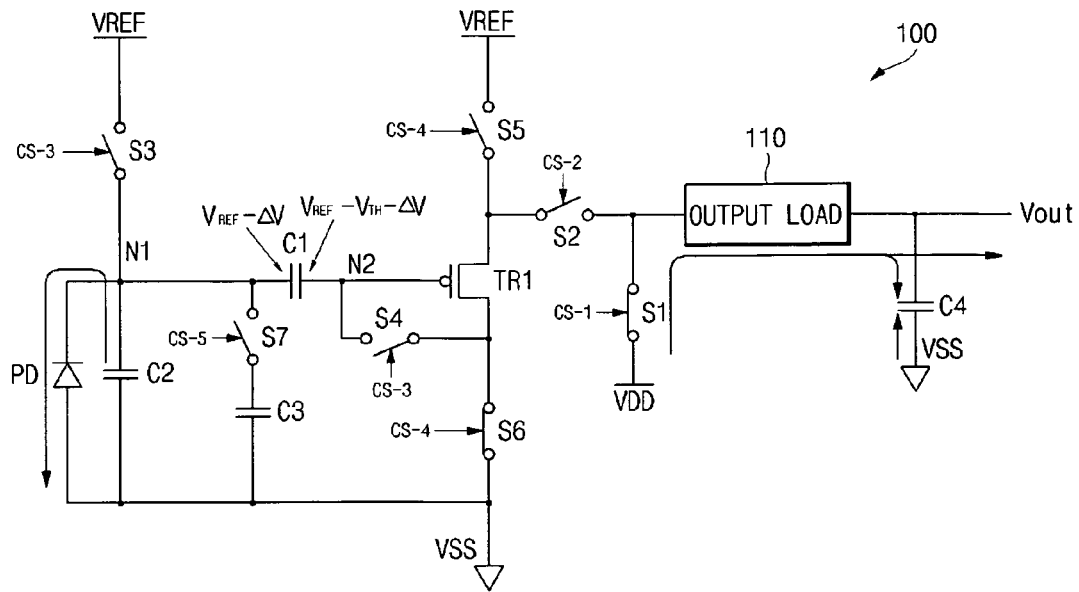
FIG. 4 illustrates a current path during an ambient light sensing period of the ambient light sensing circuit of FIG. 1A.
Figure 5:
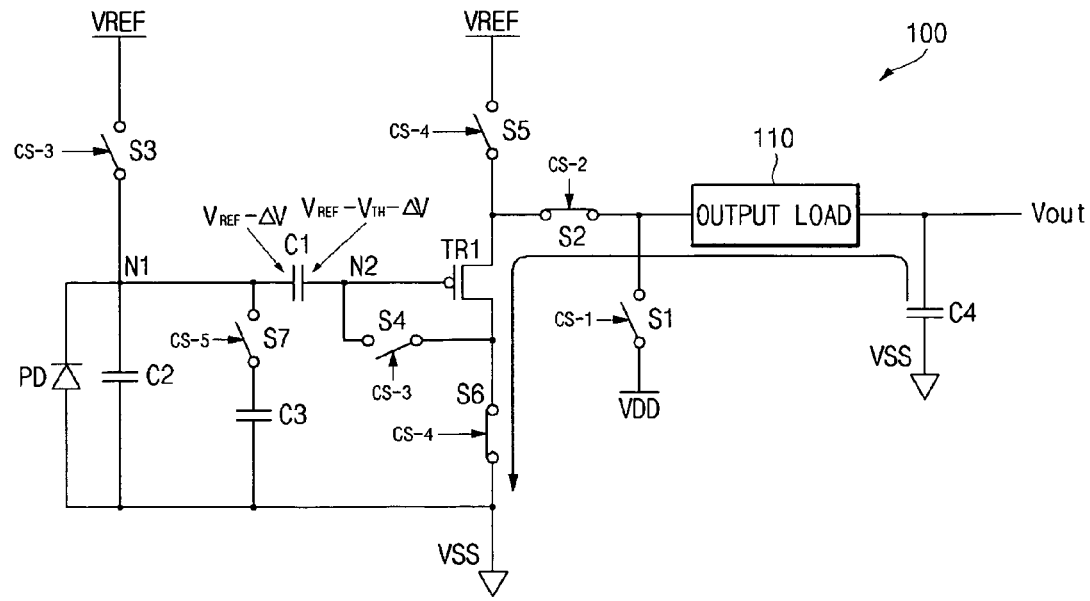
FIG. 5 illustrates a current path during a sampling period of the ambient light sensing circuit of FIG. 1A.

More particularly, FIG. 3 illustrates a current path during the threshold voltage compensating period T1 of the ambient light sensing circuit 100 of FIG. 1A, FIG. 4 illustrates a current path during the ambient light sensing period T2 of the ambient light sensing circuit 100 of FIG. 1A, and FIG. 5 illustrates a current path during the sampling period T3 of the ambient light sensing circuit of FIG. 1A.

Referring to FIG. 3, during the threshold voltage compensating period T1, current may flow so as to store a threshold voltage of the transistor TR1 in the first storage capacitor C1. As illustrated in FIG. 2 and FIG. 3, during the threshold voltage compensating period T1, the third control signal CS-3 at a low level may be applied to the third switch S3 and the fourth switch S4, the fourth control signal CS-4 at a low level may be applied to the fifth switch S5, and the first and second control signals CS-1 and CS-2 may be at a high level. Therefore, only the third switch S3, the fourth switch S4, and the fifth switch S5 may be turned on during the threshold voltage compensating period T1.

Therefore, a current path may be formed from the reference power supply VREF to the second power supply VSS via the third switch S3, the second storage capacitor C2. During the threshold voltage compensating period T1, another current path may be formed from the reference power supply VREF to the first node N1 via the third switch S3. During the threshold voltage compensating period T1, another current path may be formed from the reference power supply VREF to the second node N2 via the fifth switch S5, the transistor TR1 and the fourth switch S4.

As a result, the second storage capacitor C2 may be charged with a voltage corresponding to a difference between the voltage of the second power supply VSS and the voltage of the reference power supply VREF. More particularly, the voltage of the reference power supply VREF may be applied to the first electrode of the first storage capacitor C1 via the third switch S3. The voltage VREF-VTH obtained by subtracting the threshold voltage VTH from the voltage of the reference power supply VREF may be applied to the second electrode of the first storage capacitor C1. Therefore, the threshold voltage VTH of the transistor TR1 may be initially stored in the first storage capacitor C1. The threshold voltage VTH stored in the first storage capacitor C1 may later be discharged so as to compensate for threshold variations during operation of the transistor TR1.

Accordingly, the transistor TR1 may always outputs a predetermined voltage without being affected by a change in the threshold voltage VTH thereof. Accordingly, if, e.g., the transistor TR1 is a low temperature polycrystalline silicon thin film transistor formed by an excimer laser annealing method, electrical characteristics, e.g., threshold voltage variation, may not be uniform due to energy deviations of the excimer laser, by providing the first storage capacitor C1 as described above, variation in threshold voltage of the transistor TR1 may be compensated.

FIG. 4 illustrates a current path during the ambient light sensing period T2 during which the ambient light is sensed by the ambient light sensing circuit 100.

As illustrated in FIGS. 2 and 4, during the ambient light sensing period T2, the second storage capacitor C2 may be discharged via the photodiode PD in proportion to an ambient light incident thereon. That is, a predetermined current may flow from the second storage capacitor C2 to the second power supply VSS via the photodiode PD. If the ambient light is relatively bright, a current flowing through the photodiode PD may be relatively large. If the ambient light is relatively dark, a current flowing through the photodiode PD may be relatively small.

As described above, as a result of changes in a voltage of the second storage capacitor C2, a coupling voltage of the first storage capacitor C1 and the second storage capacitor C2 may also change. More specifically, a voltage (VREF-ΔV) may be applied to the first electrode of the second storage capacitor C1, a voltage (VREF-VTH-ΔV) may be applied to the second electrode of the first storage capacitor C1. Therefore, the voltage (VREF-VTH-ΔV) may be applied to the control electrode of the transistor TR1.

Further, during the ambient light sensing period T2, as shown in FIGS. 2 and 4, the first control signal CS-1 at a low level for at least a portion of the period T2 may be applied to the first switch S1, while the second, third and fourth control signals CS-2, CS-3 and CS-4 at a high level for the entire ambient light sensing period T2 may be applied to the ambient light sensing circuit 100. Therefore, during the ambient light sensing period T2, the first switch S1 and the sixth switch S6 may be turned on. Thus, when the first switch S1 is on, a current path may be formed from the first power supply VDD to the fourth capacitor C4 through the output load 110. Therefore, the fourth storage capacitor C4 may be charged to a level corresponding to the voltage of the first power supply VDD. The voltage of the first power supply VDD may be output via an output terminal Vout.

FIG. 5 illustrates a current path during the sampling period T3 of the ambient light sensing circuit 100 of FIG. 1A. As illustrated in FIG. 2 and FIG. 5, during the sampling period T3, the second control signal CS-2 at a low level may be applied to the second switch S2, the fourth control signal CS-4 at a high level may be applied to the sixth switch S6, and the first and third control signals CS-1 and CS-3 may be at a high level. Accordingly, during the sampling period T3, the second switch S2 and the sixth switch S6 may be turned on.

Accordingly, during the sampling period T3, a current path may be formed from the fourth storage capacitor C4 to the second power supply VSS via the output load 110, the second switch S2, the transistor TR1, and the sixth switch S6. The voltage (VREF-VTH-ΔV) may be applied to the control electrode of the transistor TR1 as a result of the coupling voltage of the first storage capacitor C1 and the second storage capacitor C2. That is, the voltage charged to the fourth storage capacitor C4 may discharge to a predetermined voltage and converge to a charged state corresponding to the sensed ambient light in response to the voltage (VREF-VTH-ΔV) applied to the control electrode of the transistor TR1.

After the fourth storage capacitor C4 is discharged to a predetermined voltage and converged to a corresponding charged state, the voltage Vout remaining in the fourth storage capacitor C4 may be output to, e.g., an analog-digital converter (not illustrated) via the output terminal.

In some embodiments of the invention, when a relatively small amount of ambient light is incident on the photodiode PD, a relatively small amount of charge corresponding to the amount of incident ambient light may be discharged from the second storage capacitor C2. Therefore, under such circumstances ΔV may be relatively small. Accordingly, the voltage (VREF-VTH-ΔV) applied to the control electrode of the transistor TR1 may be relatively high. Thus, the fourth storage capacitor C4 may discharge a relatively small amount of charge. That is, after the fourth storage capacitor C4 is discharged to a predetermined voltage and converged, a voltage remaining in the fourth storage capacitor C4 may be relatively high.

Further, when a relatively high amount of ambient light is incident on the photodiode PD, a relatively high amount of charge may be discharged from the second storage capacitor C2. Therefore, ΔV may be relatively large. Accordingly, the voltage (VREF-VTH-ΔV) applied to the control electrode of the transistor TR1 may be relatively low. Thus, the fourth storage capacitor C4 may discharge a relatively high amount of charge. That is, after the fourth capacitor C4 is discharged to a predetermined voltage and converged, a voltage remaining in the fourth storage capacitor C4 may be relatively low.

Accordingly, in embodiments of the invention, when a relatively high amount of ambient light is incident on the photodiode PD, a voltage (corresponding to the output voltage Vout) of the fourth storage capacitor C4 may be relatively lower, and when a relatively small amount of ambient light is incident on the photodiode PD, a voltage (corresponding to the output voltage Vout) of the fourth storage capacitor C4 may be relatively higher.

Operation of the seventh switch S7 and the third storage capacitor C3, which may operate in response to the fifth control signal CS-5 will be explained.

When a large amount of light is suddenly incident on the photodiode PD of the ambient light sensing circuit 100, a voltage charged in the second storage capacitor C2 may be rapidly discharged rapidly and possibly exhausted as a result. Thus, when the second storage capacitor C2 is discharged rapidly, it may not be possible to secure a reliable output voltage Vout from the transistor TR1. Thus, the incident ambient light may not be accurately sensed.

In order to reduce and/or prevent such a scenario, if the output voltage Vout, e.g., the voltage provided to an analog-digital converter, which may be fed back from the output terminal, is continuously and/or repeatedly below a predetermined level, the fifth control signal CS-5 may be applied to the control electrode of the seventh switch S7 in order to engage the third storage capacitor C3. When the seventh switch S7 is in an "on" state, each of the third storage capacitor C3 and the second storage capacitor C2 may be coupled to the photodiode PD in parallel.

When each of the third storage capacitor C3 and the second storage capacitor C2 are coupled to the photodiode PD in parallel, a reverse bias potential may be increased, i.e., current flow through the photodiode PD may be increased.

Therefore, a current may flow through the photodiode PD for a sufficient time in order to sense ambient light. A voltage remaining in the third storage capacitor C3 and the second storage capacitor C2 may contribute to a resulting voltage applied to the control electrode of the transistor TR1 and, accordingly, the operation of the transistor TR1.

Accordingly, in embodiments of the invention, the transistor TR1 may be reliably operated and an output voltage Vout may be stabilized. That is, ambient light may be sensed smoothly.

FIGS. 6A, 6B, 6C illustrate simulated graphs of changes in output voltage relative to changes in ambient light as determined by the ambient light sensing circuit of FIG. 1A.

In FIGS. 6A, 6B and 6C, the X axis of the graph corresponds to time (ms) and Y axis corresponds to output voltage Vout, $V_{G,T1(fast)}$ corresponds to a fast transistor having a $\Delta V_{TH}$ of $-1V$ and a Δmobility of +20%, $V_{G,T1(normal)}$ corresponds to a normal transistor having a $\Delta V_{TH}$ of $-1V$ and a Δmobility of +20%, and $V_{G,T1(slow)}$ corresponds to a slow transistor having a $\Delta V_{TH}$ of $+1V$ and a Δmobility of $-20\%$.

As illustrated in FIG. 6A, in the ambient light sensing circuit 100 according to the present invention, when a current $I_{PIN}$ flowing through the photodiode PD is, e.g., 25 pA, the output voltage Vout at the output terminal thereof may be discharged to approximately 5.068 V to approximately 5.104 V before converging. The output voltage Vout through the output terminal may correspond to the output voltage Vout of the fourth storage capacitor C4.

As illustrated in FIG. 6B, in the ambient light sensing circuit 100, when the current $I_{PIN}$ flowing through the photodiode PD is, e.g., 120 pA, the output voltage Vout at the output terminal may be discharged to approximately 4.793V to approximately 4.825V before converging.

As illustrated in FIG. 6C, in the ambient light sensing circuit 100, when the current PIN flowing through the photodiode PD is, e.g., 566 pA, the output voltage Vout at the output terminal may be discharged to approximately 3.457 V to approximately 3.483 V before converging.

In the ambient light sensing circuit 100, the smaller the current $I_{PIN}$ flowing through the photodiode PD is, the larger the output voltage Vout may be, i.e., the larger the voltage of the fourth storage capacitor C4. Further, in the ambient light sensing circuit 100, the larger the current $I_{PIN}$ flowing through the photodiode PD is, the smaller the output voltage Vout may be, i.e., the smaller the voltage of the fourth storage capacitor C4.

In embodiments of the invention, deviation of the output voltage Vout from an ambient light sensing circuit, e.g., the ambient light sensing circuit 100, may be maintained constant and/or substantially constant regardless of an amount of the current $I_{PIN}$ flowing through the photodiode PD. That is, the ambient light sensing circuit according to one or more aspects of the invention, e.g., the ambient light sensing circuit 100, may provide an accurate output voltage Vout corresponding to incident ambient light irrespective of intensity of the ambient light.

More particularly, an ambient light sensing circuit according to one or more aspects of the present invention, e.g., the ambient light sensing circuit 100, may accurately sense ambient light because, as illustrated in FIGS. 6A, 6B and 6C, the output voltage Vout is maintained as constant and/or substantially constant even if a remarkable difference exists with respect to a voltage of the control electrode of the transistor TR1 as a result of variations of, e.g., threshold voltage and/or differences in mobility.

In FIGS. 6A, 6B and 6C, the protruded waveform indicated as Vout may be generated when the first switch S1 is turned on during the ambient light sensing period T2 and the first power supply voltage VDD is output to the output load 110.

Figure 7:
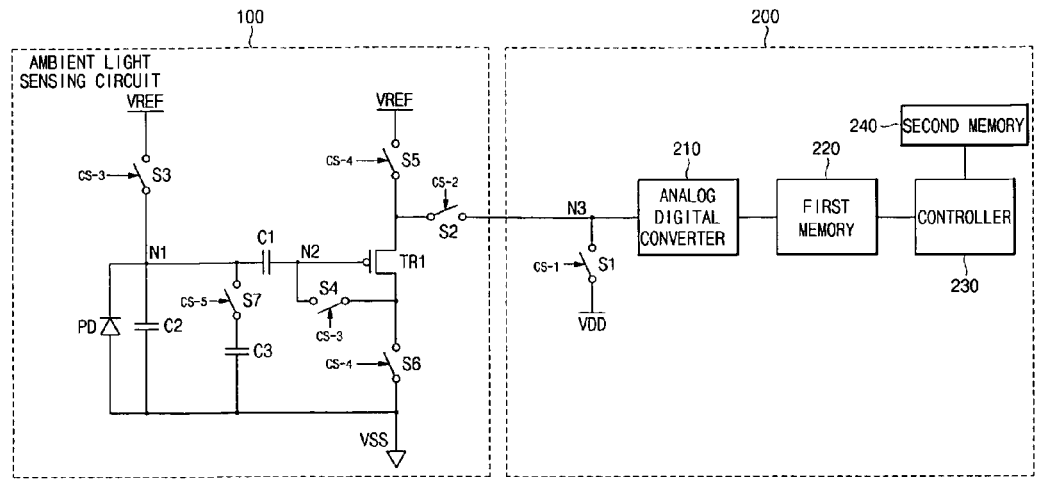
FIG. 7 illustrates a block diagram of a state in which an exemplary embodiment of an ambient light control processor is coupled with the ambient light sensing circuit of FIG. 1A according to aspects of the invention.

FIG. 7 illustrates a block diagram of a state in which an exemplary embodiment of an ambient light control processor 200 is coupled with the ambient light sensing circuit 100 of FIG. 1A.

As illustrated in FIG. 1A, according to aspects of the invention, the ambient light control processor 200 may receive and process a signal from the ambient light sensing circuit 100. The ambient light control processor 200 may include an analog-digital converter 210, a first memory 220, a controller 230 and a second memory 240.

The analog-digital converter 210 may be coupled to the second electrode of the first switch S1, i.e., the third node N3 of the ambient light sensing circuit 100. In some embodiments, the output load 110 and the fourth storage capacitor C4 may be included in the analog-digital converter 210. The output load may be an internal load of the analog-digital converter 210, and the fourth storage capacitor C4 may be a capacitive component of a wire. The analog-digital converter 210 may convert the output voltage Vout from an analog signal to a digital signal, and then output the output voltage Vout in digital form.

The first memory 220 may be coupled with the analog-digital converter 210. The first memory 220 may temporarily store a digital value in accordance with presently sensed ambient light.

The controller 230 may be coupled to the first memory 230. The controller 230 may calculate brightness of the presently sensed ambient light. The controller 230 may output the calculated brightness.

The second memory 240 may be coupled to the controller 230. The second memory 240 may store digital values previously obtained ambient light of different brightness levels.

In some embodiments of the invention, sensed ambient light data input from the first memory 220 may be compared with ambient light data of different brightness levels stored in the second memory 240 in order to determine brightness of presently sensed ambient light corresponding to the sensed ambient light data input to the ambient light control processor 200.

Figure 9:
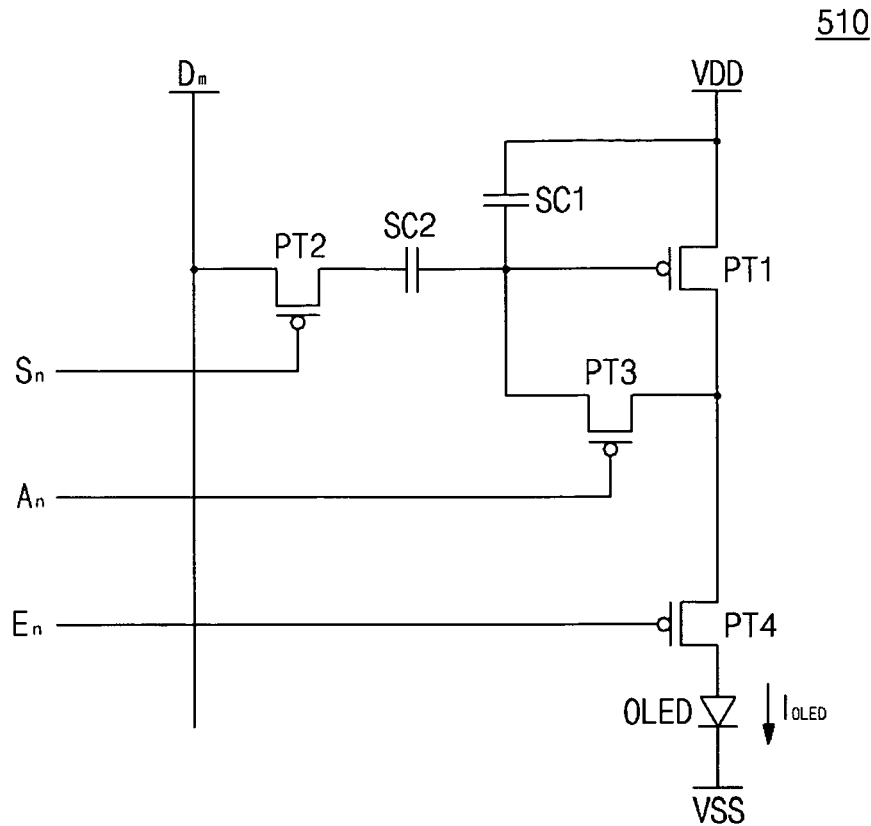
FIG. 9 illustrates a circuit diagram of an exemplary pixel circuit of an organic light emitting display panel.

Further, as shown in FIG. 9, in some embodiments of the invention, the reference power supply VREF and the fifth and second switches S5, S2 coupled to the reference power supply VREF may be included in the ambient light sensing circuit, and the first power supply VDD and the first switch S1 may be included formed in the ambient light control processor, but embodiments of the invention are not limited thereto. More particularly, e.g., in some embodiments of the invention, all of those elements may be included in one of the ambient light sensing circuit 100 or the ambient light control processor 200.

In some embodiments of the invention, the ambient light sensing circuit 100 may be formed on a same substrate as that on which a pixel(s) is formed, e.g., an organic light emitting display panel, while the ambient light control processor 200 may be formed independently as one chip. However, embodiments of the invention are not limited thereto. For example, in some embodiments, the ambient light control processor 200 may be formed on a same substrate as that on which pixel(s) is formed, e.g., an organic light emitting display panel.

Further, e.g., in some embodiments, the first switch S1 may be included in the ambient light control processor 200 provided in the form of one chip, or may be included in the ambient light sensing circuit 100 formed on a same substrate as that on which a pixel(s) is formed.

Figure 8:
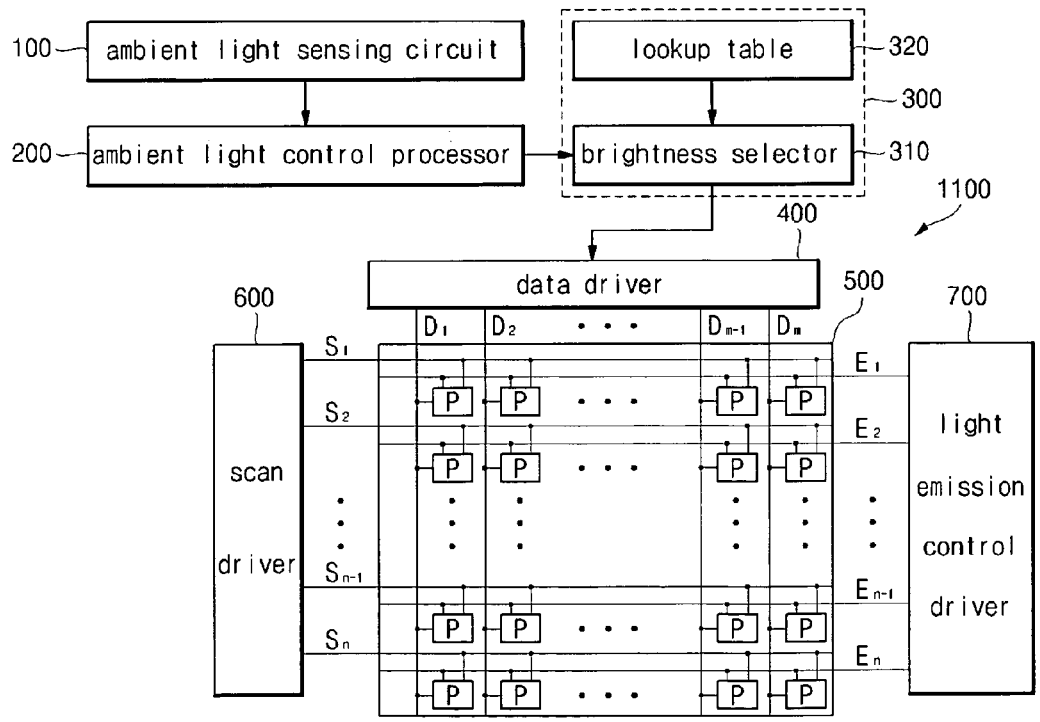
FIG. 8 illustrates a block diagram of an exemplary embodiment of a flat panel display including the ambient light sensing circuit of FIG. 1A according to aspects of the invention.

FIG. 8 illustrates a block diagram of an exemplary embodiment of a flat panel display 1100 including the ambient light sensing circuit 100 of FIG. 1A according to aspects of the invention.

As shown in FIG. 8, the flat panel display 1100 employing one or more aspects of the invention may include the ambient light sensing circuit 100, the ambient light control processor 200, a timing controller 300, a data driver 400, an organic light emitting display panel 500, a scan driver 600, and an emission control driver 700. The structure and the operations of the ambient light sensing circuit 100 and the ambient light control processor 200 was explained in detail as above, and here, explanation will be minimized. Although the flat panel display 1100 is shown including the ambient light sensing circuit 100, embodiments of the invention are not limited thereto and may employ other ambient light sensing circuits employing aspects of the invention, e.g., the ambient light sensing circuit 101 of FIG. 1B.

Further, in the exemplary embodiments described herein, an organic light emitting display panel is employed as an example. That is, embodiments of the invention are not limited thereto and one or more aspects of the invention may be applied to, e.g., other displays including, e.g., liquid crystal light emitting display panels.

In the organic light emitting display panel 500, a circuit part, e.g., pixel circuit, and an organic light emitting layer may form a pixel P. A plurality of such pixels P may be arranged in a matrix format and may display a stationary image or a dynamic image. The organic light emitting display panel 500 may include a plurality of data lines D1 to Dm extending from the data driver 400, a plurality of scan lines S1 to Sn extending from the scan driver 600, and a plurality of light emission control lines E1 to En extending from the light emission control driver 700. Each pixel P may be formed in an area where respective portions of the data lines D1 to Dm, the scan lines S1 to Sn, and the light emission control lines E1 to En intersect.

The timing controller 300 may include a brightness selector 310 and a lookup table 320. The brightness selector 310 may compare a digital value input from the ambient light control processor 200 with a value previously stored in the lookup table 320, and may output a data control signal corresponding to the input digital value to the data driver 400.

More particularly, e.g., an optimum brightness control data signal that may be matched to a digital value input from the ambient light control processor 200 for red, green and blue data R, G, B may be previously stored in the lookup table 320.

Based on the data control signal supplied from the brightness selector 310, the data driver 400 may output a data signal corresponding to outside ambient light to the organic light emitting panel 500. For example, if the sensed ambient light is relatively bright, then a screen of relatively high brightness may be allowed to be displayed on the organic light emitting display panel 500 by outputting a data voltage |V| that outputs relatively bright light. Furthermore, if the sensed ambient light is relatively dark, then a screen of relatively low brightness may be allowed to be displayed on the organic light emitting display panel 500 by outputting a data voltage |V| that outputs relatively dark light.

Accordingly, embodiments of the invention may provide a display device that may automatically adjust screen brightness in accordance with the outside ambient light by, e.g., adjusting a magnitude of a data voltage |V| supplied to the respective data line Dm.

The scan driver 600 may supply a scan signal(s) to the organic light emitting display panel 500 so as to select respective pixel(s) P that is intended to be switched on and respective pixel(s) P that is intended to be switched off. The light emission control driver 700 may supply a respective light emission time signal that corresponds to switched-on time of each pixel P to the organic light emitting display panel 500. As the scan driver 600 and the light emission control driver 700 are well known to a person having ordinary skill in the art, detailed explanation thereof will be omitted.

In some embodiments of the invention, the ambient light sensing circuit 100, the ambient light control processor 200, the timing controller 300, the data driver 400, the organic light emitting display panel 500, the scan driver 600, and the light emission control driver 700 may all be formed on one common substrate through a semiconductor process and a thick film process. In some embodiments of the present invention, at least one of the ambient light sensing circuit 100, the ambient light control processor 200, the timing controller 300, the data driver 400, the organic light emitting display panel 500, the scan driver 600, and the light emission control driver 700 may be formed on a chip or a different substrate from a substrate on which the organic light emitting display panel 500 is formed. However, embodiments of the invention are not limited thereto. Further, e.g., one or more elements, e.g., transistor, of respective parts, e.g., ambient light control processor 200, may be included with other one(s) of the parts, e.g., ambient light sensing unit 101.

At least one of the ambient light sensing circuit 100, the ambient light control processor 200, the timing controller 300, the data driver 400, the organic light emitting display panel 500, the scan driver 600, and the emission control driver 700 may be formed using, e.g., a low temperature polycrystalline silicon thin film transistor (LTPS-TFTs). However, embodiments of the invention are not limited to such a fabricating method.

Figure 10:
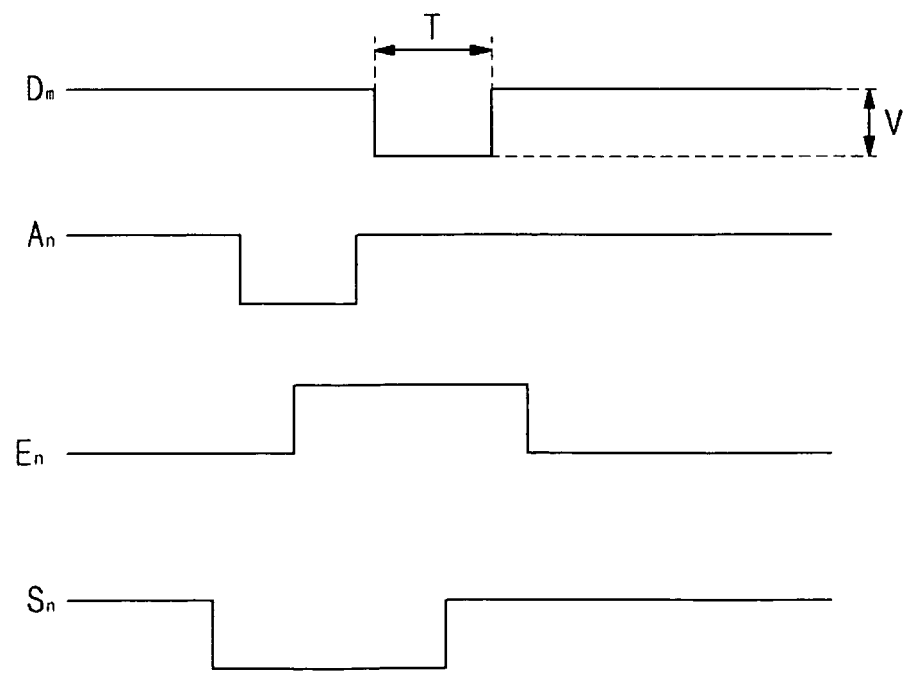
FIG. 10 illustrates an exemplary timing diagram of exemplary signals employable by the pixel circuit of FIG. 9 when employed in the exemplary flat panel display of FIG. 8.

FIG. 9 illustrates a circuit diagram of an exemplary pixel circuit 510 of an organic light emitting display panel. FIG. 10 illustrates a timing diagram of exemplary signals employable for driving the pixel circuit 510 of FIG. 9 when the pixel circuit 510 is employed in the flat panel display 1100 of FIG. 8.

As shown in FIG. 9, the pixel circuit 510 may include a scan line Sn for supplying a scan signal, a data line Dm for supplying a data voltage, a first power supply line for supplying the first power supply VDD voltage, a second power supply line for supplying the second power supply VSS voltage, an auto-zero line An for supplying an auto-zero signal, a light emission control line En for supplying a light emission control signal, a first transistor PT1, a second transistor PT2, a third transistor PT3, a fourth transistor PT4, a first storage capacitor SC1, a second storage capacitor SC2 and an organic light emitting diode OLED. A voltage of the first power supply line VDD may be relatively higher than a voltage of the second power supply line VSS.

A first electrode of the first transistor PT1 may be electrically coupled to the first power supply line and a first electrode of the first storage capacitor SC1, a second electrode of the first transistor PT1 may be electrically coupled to a first electrode of the third transistor PT3 and a first electrode of the fourth transistor PT4, and a control electrode of the first transistor PT1 may be electrically coupled to a first electrode of the second storage capacitor SC2 and a second electrode of the first storage capacitor SC1 and a second electrode of the third transistor PT3. A second electrode of the second storage capacitor SC2 may be electrically coupled to a first electrode of the second transistor PT2. A second electrode of the second transistor PT2 may be electrically coupled to the data line Dm. A control electrode of the second transistor PT2 may be electrically coupled to the scan line Sn. A control electrode of the third transistor PT3 may be electrically coupled to the auto-zero line An. A control electrode of the fourth transistor PT4 may be electrically coupled to the light emission control line En, and a second electrode of the fourth transistor PT4 may be electrically coupled to the organic light emitting diode OLED. In the exemplary embodiment of the pixel circuit 510 illustrated in FIG. 9, all of the transistors PT1, PT2, PT3 and PT4 are illustrated as P-type transistors, however, embodiments of the invention are not limited thereto.

Referring to FIGS. 9 and 10, in embodiments of the invention employing the pixel circuit 510, if an auto-zero signal at a low level is applied from the auto-zero line An to the control electrode of the third transistor PT3, the third transistor PT3 is turned on. Thus, the first transistor PT1 may be in a diode-coupled state, and a threshold voltage of the first transistor PT1 may be stored in the first storage capacitor SC1. Next, if a light emission signal at a high level is applied from the light emission control line En to the control electrode of the fourth transistor PT4, the fourth transistor PT4 is turned off. Next, the auto-zero signal may change to a high level and the third transistor PT3 may be turned off. Then, if a scan signal at a low level is applied from the scan line Sn to the control electrode of the second transistor PT2, the second transistor PT2 is turned on. When the second transistor PT2 is turned on, a data voltage at a low level may be applied from the data line Dm to the second storage capacitor SC2. Then, a data voltage corresponding to a threshold voltage of the first transistor PT1 and a coupling ratio of the first storage capacitor SC1 and the second storage capacitor SC2 may be applied to the control electrode of the first transistor TR1 (data recording operation).

Next, if a light emission signal at a low level is applied from the light emission control line En to the control electrode of the fourth transistor PT4, the fourth transistor PT4 is turned on. Thus, a predetermined current may flow from the first power supply line VDD to the organic light emitting diode OLED through the first transistor PT1 such that the organic light emitting diode OLED may emit light.

By employing the pixel circuit 510, a current flowing through the organic light emitting diode OLED may correspond to a data voltage supplied from the data line Dm irrespective of a threshold voltage of the first transistor PT1.

In embodiments of the invention, screen brightness may be automatically adjusted in accordance with ambient brightness, i.e., sensed ambient brightness. More specifically, in embodiments of the invention, a data voltage through the data line Dm of the pixel circuit 510 may be adjusted such that a coupling voltage of the first storage capacitor SC1 and the second storage capacitor SC2 may be adjusted and an amount of current supplied to the organic light emitting diode OLED $I_{OLED}$ through the first transistor PT1 may be controlled, i.e., may be varied based on sensed ambient brightness.

More particularly, referring to FIG. 10, the characteristic of the data voltage $D_M$ that may be adjusted in embodiments of the invention in relation to sensed ambient light is not time T, but a magnitude of voltage such that a data voltage stored in the first storage capacitor SC1 may vary, and an amount of current flowing through the organic light emitting diode OLED may vary. In embodiments of the invention, e.g., when ambient brightness is low, a data voltage |V| that generates relatively dark light may be supplied such that an amount of current flowing through the organic light emitting diode OLED may be reduced and a relatively dark screen may be displayed. Further, in embodiments of the invention, when ambient brightness is high, a data voltage |V| that generates relatively bright light may be supplied such that an amount of current flowing through the organic light emitting diode OLED may be increased and a relatively bright screen may be displayed.

Figure 11:
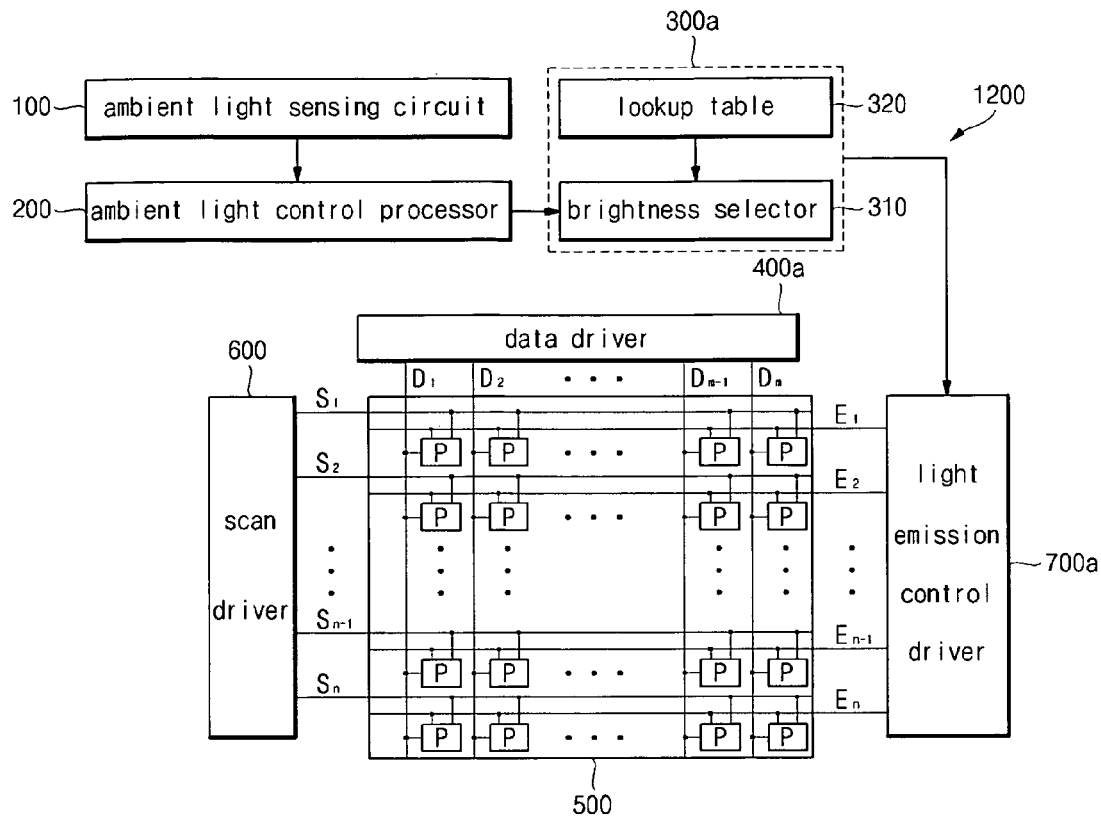
FIG. 11 illustrates a block diagram of another exemplary embodiment of a flat panel display including the ambient light sensing circuit of FIG. 1A according to aspects the invention.

FIG. 11 illustrates a block diagram of another exemplary embodiment of a flat panel display 1200 including the ambient light sensing circuit 100 of FIG. 1A according to aspects the invention. In general, only differences between the flat panel display 1200 and the flat panel display 1100 will be described below.

As shown in FIG. 11, the flat panel display 1200 may include a timing controller 300a, a data driver 400a, the organic light emitting display panel 500, the scan driver 600, and a light emission control driver 700a, as well as the ambient light sensing circuit 100 and the ambient light control processor 200. Although the flat panel display 1200 is shown including the ambient light sensing circuit 100, embodiments of the invention are not limited thereto and may employ other ambient light sensing circuits employing aspects of the invention, e.g., the ambient light sensing circuit 101 of FIG. 1B.

The timing controller 300a may include the brightness selector 310 and the lookup table 320. The brightness selector 310 may compare a digital value input from the ambient light control processor 200 with a value previously stored in the lookup table 320, and may output a control signal corresponding to the input digital value to the light emission control driver 700a. More particularly, e.g., an optimum brightness control signal that may be matched to a digital value input from the ambient light control processor for red, green and blue data R, G, B may be previously stored in the lookup table 320.

Based on the control signal supplied from the timing controller 300a, the light emission control driver 700 may output a light emission control signal corresponding to outside ambient light to the organic light emitting panel 500. For example, if the sensed ambient light is relatively bright, then a screen of relatively high brightness may be displayed on the organic light emitting display panel 500 by outputting a light emission control signal that is on, e.g., at a low level, for a relatively long period of time. Further, if the sensed ambient light is relatively dark, then a screen of relatively low brightness may be displayed on the organic light emitting display panel 500 by outputting a light emission control signal that is on, e.g., at a low level, for a relatively short period of time.

Accordingly, some embodiments of the invention may provide a display device that automatically adjusts screen brightness in accordance with the outside ambient light by, e.g., adjusting a period of time which a respective light emission control signal is on, e.g., at a low level.

In some embodiments, the data driver 400a may supply a data voltage(s) to the organic light emitting display panel 500, and the scan driver 600 may supply a scan signal(s) to the organic light emitting display panel 500 to select a pixel(s) that is intended to be switched on and a pixel(s) that is intended to be switched off. As the data driver 400a and the scan driver 600 are well known to a person having ordinary skill in the art, detailed explanation about them will be omitted.

Figure 12:
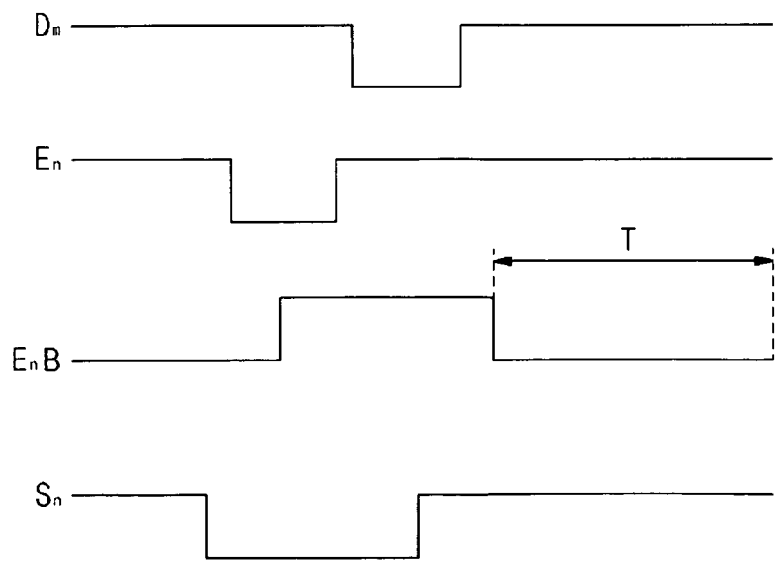
FIG. 12 illustrates another exemplary timing diagram of exemplary signals employable by the pixel circuit of FIG. 9 when employed in the exemplary flat panel display of FIG. 11.

FIG. 12 illustrates another exemplary timing diagram of exemplary signals for driving the pixel circuit 510 of FIG. 9 when the pixel circuit 510 is employed in the flat panel display 1200 of FIG. 11.

As described above, in some embodiments of the invention, screen brightness may be automatically adjusted in accordance with ambient brightness by, e.g., adjusting an "on-time" of a light emission control signal supplied through the light emission control line En of the respective pixel circuit 510 so as to adjust a light emission time of the corresponding organic light emitting diode OLED associated therewith.

More particularly, referring to FIG. 12, in some embodiments of the invention, a time T of a light emission control signal supplied to the respective light emission control line En of the pixel circuit 510 maybe adjusted so as to adjust a light emission time of the corresponding organic light emitting diode OLED associated therewith. For example, when ambient brightness, i.e., sensed ambient brightness, is low, a light emission time of the organic light emitting diode OLED may be relatively shortened by shortening a period of time T that the respective light emission control signal supplied to the light emission control line En of the pixel circuit 510 is on, i.e., at a low level, so that a relatively dark screen may be displayed. Further, when ambient brightness, i.e., sensed ambient brightness, is high, a light emission time of the organic light emitting diode OLED may be relatively lengthened by lengthening a period of time T that the respective light emission control signal supplied to the light emission control line En of the pixel circuit 500 is on, i.e., at a low level, so that a relatively bright screen may be displayed.

Figure 13:
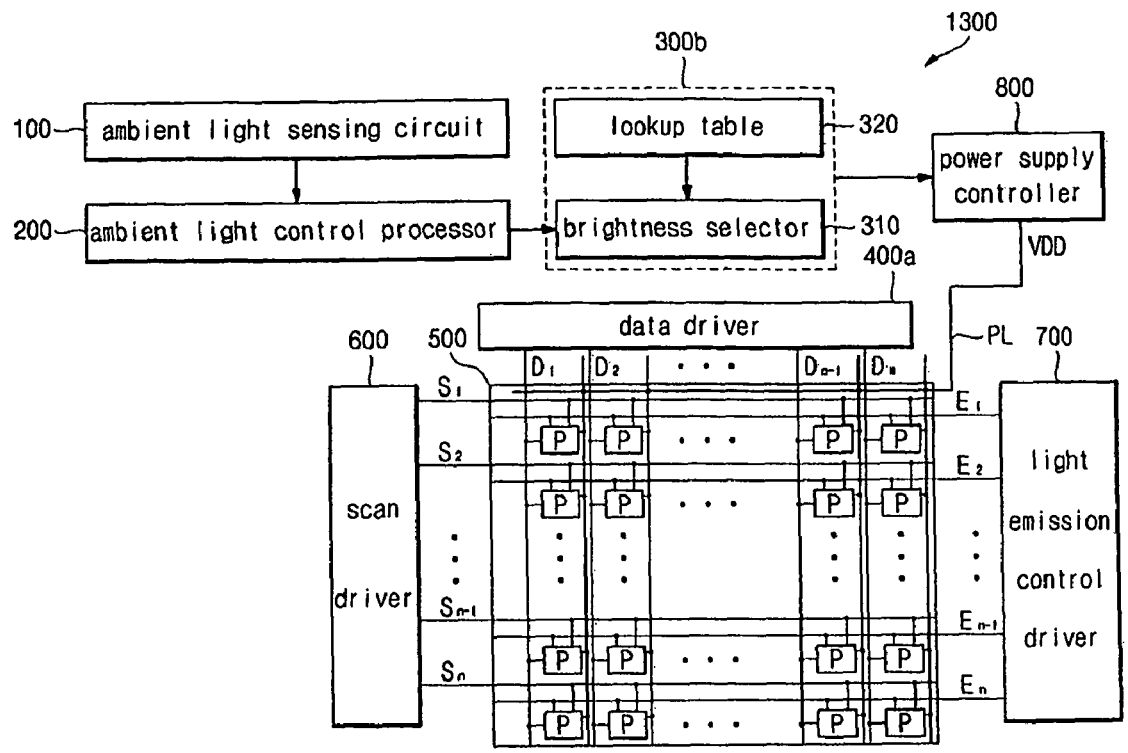
FIG. 13 illustrates a block diagram of another exemplary embodiment of a flat panel display including the ambient light sensing circuit of FIG. 1A according to aspects of the invention.

FIG. 13 illustrates a block diagram of another exemplary embodiment of a flat panel display 1300 including the ambient light sensing circuit of FIG. 1A according to aspects of the invention. In general, only differences between the flat panel display 1300 and the other exemplary flat panel displays 1100, 1200 will be described below.

Referring to FIG. 13, the flat panel display 1300 may include timing controller 300b, the data driver 400a, the organic light emitting display panel 500, the scan driver 600, the light emission control driver 700 and a power supply controller 800, as well as the ambient light sensing circuit 100 and the ambient light control processor 200.

Furthermore, in the organic light emitting display panel 500, a circuit part, e.g., pixel circuit, and an organic light emitting layer may form one pixel P, and a plurality of such pixels P may be arranged in a matrix format and may display a stationary image or a dynamic image. That is, the organic light emitting display panel 500 may include the plurality of data lines D1 to Dm extending from the data driver 400a, the plurality of scan lines S1 to Sn extending from the scan driver 600, the plurality of light emission control lines E1 to En extending from the light emission control driver 700, and a plurality of power supply lines PL extending from the power supply controller 800.

The timing controller 300b may include the brightness selector 310 and the lookup table 320. The brightness selector 310 may compare a digital value input from the ambient light control processor 200 with a value previously stored in the lookup table 320, and may output a control signal corresponding to the input digital value to the power supply controller 800. More particularly, e.g., an optimum control signal that may be matched to a digital value input from the ambient light control processor 200 for red, green and blue data R, G, B may be previously stored in the lookup table 320.

Based on the control signal supplied from the timing controller 300b, the power supply controller 800 may supply a power supply voltage corresponding to outside ambient light, i.e., sensed ambient light, to the organic light emitting display panel 500. For example, if the sensed ambient light is relatively bright, then a screen of relatively high brightness may be allowed to be displayed on the organic light emitting display panel 500 by supplying a high power supply voltage. Further, if the sensed ambient light is relatively dark, then a screen of relatively low brightness may be displayed on the organic light emitting display panel 500 by supplying a relatively low power supply voltage.

Accordingly, some embodiments of the invention may provide a display device that automatically adjusts screen brightness in accordance with the outside ambient light by, e.g., adjusting a power supply voltage supplied to the panel 500.

In such embodiments, the data driver 400a may supply a data voltage(s) to the organic light emitting display panel 500, and the scan driver 600 may supply a scan signal(s) to the organic light emitting display panel 500 to select a pixel(s) that is intended to be switched on and a pixel(s) that is intended to be switched off. Furthermore, the light emission control driver 700 may determine an actual switched-on time of a pixel by supplying a light emission control signal to the organic light emitting display panel 500. As the data driver 400a, the scan driver 600 and the light emission control driver 700 are well known to a person having ordinary skill in the art, detailed explanation about them will be omitted.

In embodiments, all of the ambient light sensing circuit 100, the ambient light control processor 200, the timing controller 300b, the data driver 400a, the organic light emitting display panel 500, the scan driver 600, the light emission control driver 700 and the power supply controller 800 may be formed on one common substrate through, e.g., a semiconductor process and a thick film process. However, embodiments of the invention are not limited thereto. For example, at least one of the ambient light sensing circuit 100, the ambient light control processor 200, the timing controller 300b, the data driver 400a, the scan driver 600, the light emission control driver 700, and the power supply controller 800 may be formed on a chip or a different substrate from a substrate on which the organic light emitting display panel 500 is formed, using, e.g., low temperature polycrystalline silicon thin film transistors (LTPS-TFTs). Further, e.g., one or more elements, e.g., transistor, of respective parts, e.g., ambient light control processor 200, may be included with other one(s) of the parts, e.g., ambient light sensing unit 101.

Figure 14:
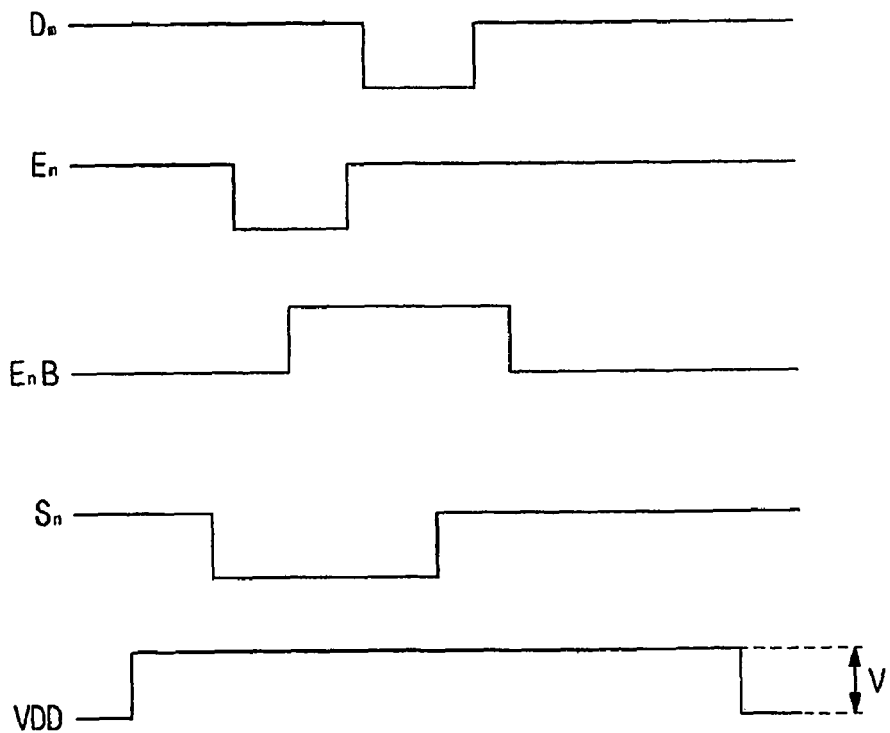
FIG. 14 illustrates another exemplary timing diagram of exemplary signals employable by the pixel circuit of FIG. 9 when employed in the exemplary flat panel display of FIG. 13.

FIG. 14 illustrates another exemplary timing diagram of exemplary signals for driving the pixel circuit 510 of FIG. 9 when the pixel circuit 510 is employed in the flat panel display 1300 of FIG. 13.

FIG. 13a illustrates a circuit diagram of one example of a pixel circuit of an organic light emitting display panel in the flat display device, and FIG. 13b illustrates the timing diagram.

As described above, in some embodiments of the invention, screen brightness may be automatically adjusted based on ambient brightness, i.e., sensed ambient brightness by adjusting, e.g., a voltage of a power supply. More specifically, in some embodiments of the invention, brightness of a respective organic light emitting diode OLED(s) of the display panel 500 may be adjusted by adjusting a voltage of the first power supply VDD of the pixel circuit 510.

That is, referring to FIG. 14, a voltage (V) of the first power supply VDD may be adjusted so as to adjust brightness of the organic light emitting diode OLED. As a result, when ambient brightness is relatively low, brightness of the organic light emitting diode OLED may be relatively lowered by supplying a relatively low power supply voltage, and thus a relatively dark screen may be displayed. Further, when ambient brightness is relatively high, brightness of the organic light emitting diode OLED may be relatively increased by supplying a relatively high power supply voltage such that a relatively bright screen may be displayed.

Figure 15:
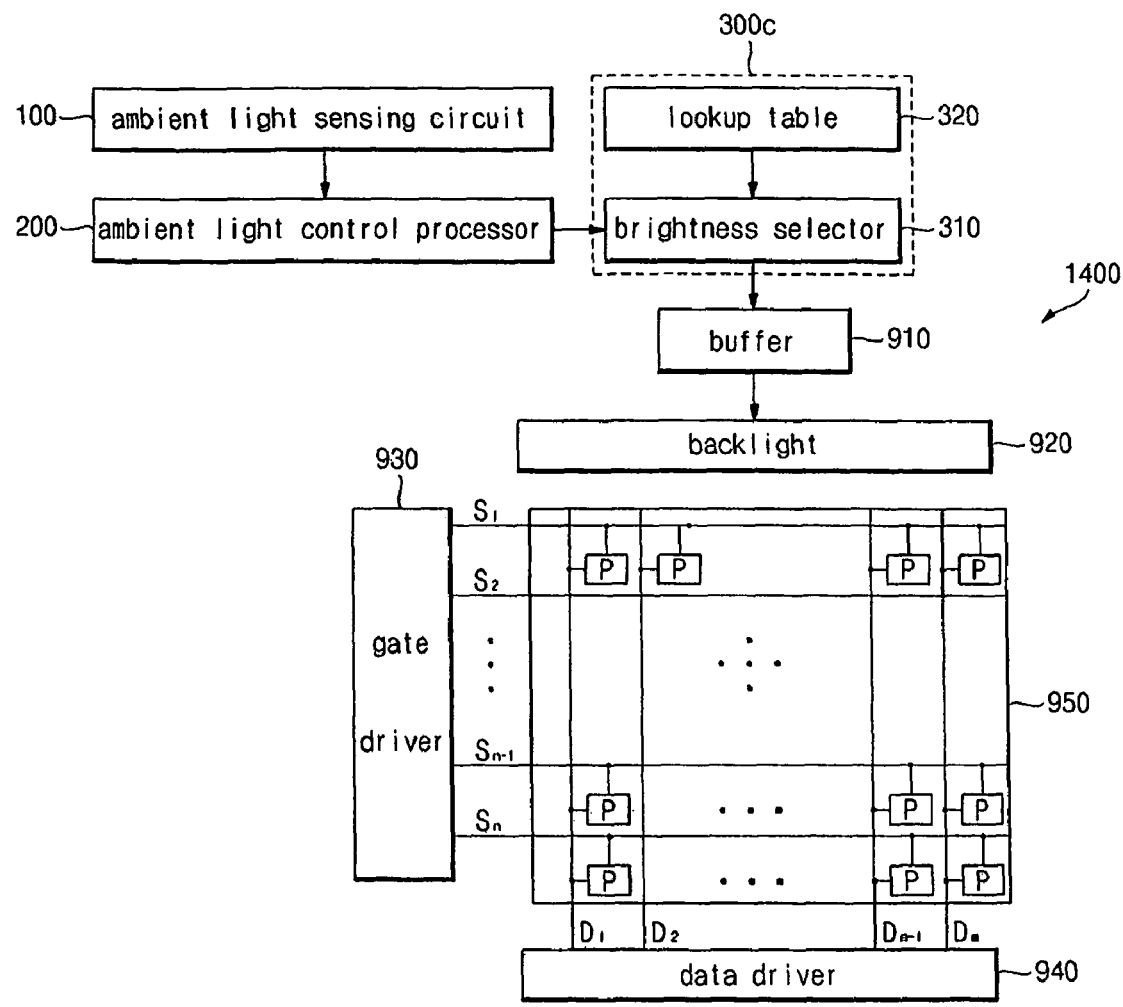
FIG. 15 illustrates a block diagram of another exemplary embodiment of a flat panel display including the ambient light sensing circuit of FIG. 1A according to aspects of the invention.

FIG. 15 illustrates a block diagram of another exemplary embodiment of a flat panel display 1400 including the ambient light sensing circuit of FIG. 1A according to aspects of the invention. In general, only differences between the flat panel display 1400 and the other exemplary flat panel displays 1100, 1200, 1300 will be described below.

Figure 16:
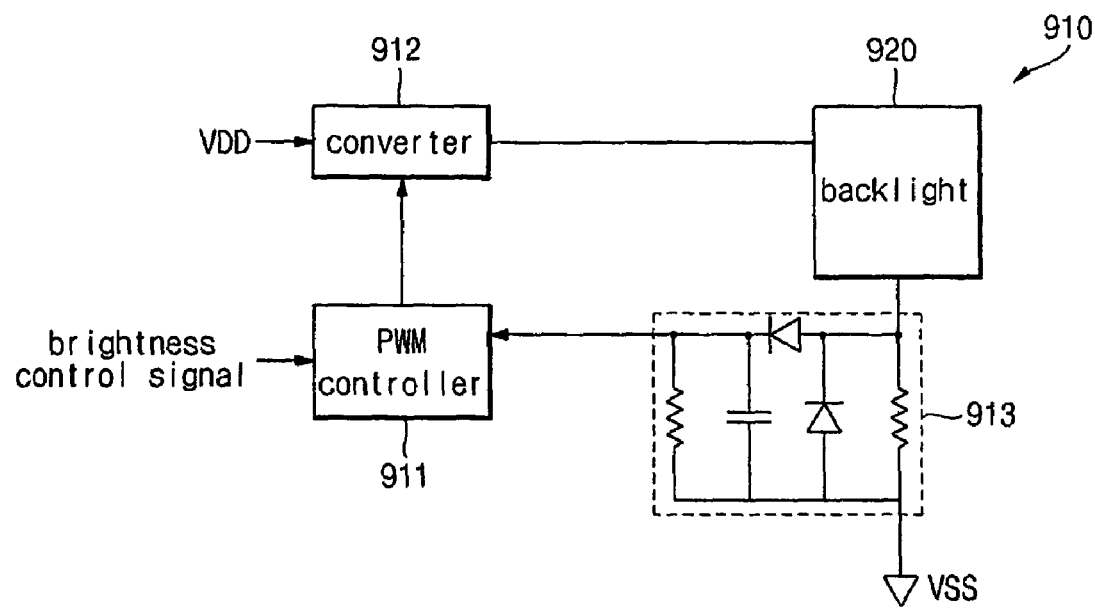
FIG. 16 illustrates a block diagram of an exemplary embodiment of the buffer employable by the flat panel display shown in FIG. 15.

As shown in FIG. 16, the flat panel display 1400 may include a timing controller 300c, a buffer 910, a backlight 920, a gate driver 930, a data driver 940, and a liquid crystal display panel 950, as well as the ambient light sensing circuit 100 and the ambient light control processor 200.

The timing controller 300c may include the brightness selector 310 and the lookup table 320. The brightness selector 310 may compare a digital value input from the ambient light control processor 200 with a value previously stored in the lookup table 320, and may output a control signal corresponding to the input digital value to the buffer 910. More particularly, e.g., an optimum brightness control signal that may be matched to a digital value input from the ambient light control processor 200 may be previously stored in the lookup table 320.

The buffer 910 may supply a boosted voltage corresponding to outside ambient light to the backlight 920. For example, if the sensed ambient light is relatively bright, then the buffer 910 may supply a relatively high boosted voltage to the backlight 920, and thus a screen of high brightness may be displayed on the liquid crystal display panel 950. Furthermore, if the sensed ambient light is relatively dark, then the buffer 910 may supply a relatively low boosted voltage to the backlight 920, and thus a screen of low brightness may be displayed on the liquid crystal display panel 950.

Accordingly, in some embodiments of the invention, a display device may automatically adjust screen brightness in accordance with sensed outside ambient light by controlling a voltage supplied to the backlight.

In the liquid crystal display panel 950, a circuit part and a color filter may form a pixel P. A plurality of such pixels may be arranged in a matrix format and may display a stationary image or a dynamic image. The circuit part and the color filter may serve as a kind of camera shutter. The backlight 920, which may be a high brightness light emitting diode or a cold cathode fluorescent lamp (CCFL), may be positioned on the rear side of the liquid crystal display panel 950. Thus, an image having a predetermined brightness may be displayed by light emitted from the backlight 920. Furthermore, the liquid crystal display panel 950 may be formed thereon with a plurality of scan lines S1 to Sn extending from the gate driver 930 and a plurality of data lines D1 to Dm extending from the data driver 940.

The gate driver 930 may supply a scan signal(s) to the liquid crystal display panel 950, and the data driver 940 may supply a data voltage(s) to the liquid crystal display panel 950. As the gate driver 930 and the data driver 940 are well known to a person having ordinary skill in the art, detailed explanation about them will be omitted.

In some embodiments of the invention, all of the ambient light sensing circuit 100, the ambient light control processor 200, the timing controller 300c, the buffer 910, the gate driver 930, the data driver 940 and the liquid crystal display panel 950 may be formed on one common substrate through a semiconductor process and a thick film process. However, embodiments of the invention are not limited thereto. For example, in some embodiments, at least one of the ambient light sensing circuit 100, the ambient light control processor 200, the timing controller 300c, the buffer 910, the gate driver 930, and the data driver 940 may be formed on a chip or a different substrate from a substrate on which the liquid crystal display panel 950 is formed.

At least one of the ambient light sensing circuit 100, the ambient light control processor 200, the timing controller 300, the inverter 910, the gate driver 930, the data driver 940 and the liquid crystal display panel 950 may be formed by a low temperature polycrystalline silicon thin film transistors (LTPS-TFTs), but embodiments of the invention are not limited by the fabricating method thereof.

FIG. 16 illustrates a block diagram of an exemplary embodiment of the buffer employable by the flat panel display shown in FIG. 15.

As shown in FIG. 16, the buffer 910 may include a PWM (pulse width modulation) controller 911, a converter 912, and a current detector 913. The PWM controller 911 may output a PWM control signal corresponding to a control signal. The control signal may be received from the timing controller 300c and may correspond to the sensed brightness. The converter 912 may receive the PWM control signal from the PWM controller 911 and may boost the power supply voltage VDD to a predetermined level based on the received PWM control signal. The current detector 913 may receive a current from the backlight 920 and may supply the received current to the PWM controller 911. Such a constitution of the buffer 910 is merely an example, and various constitutions of the buffer may be realized.

As described above, a control signal corresponding to sensed brightness may be input from the timing controller 300c to the PWM controller 911. Then, the PWM controller 911 may output a PWM control signal that matches the above-mentioned control signal to the converter 912. Accordingly, if the sensed ambient light is dark, then a PWM control signal that relatively lowers a boosted voltage may be output, or if the sensed ambient light is bright, then a PWM control signal that relatively increases a boosted voltage may be output.

Then, the converter 912 may receive the power supply voltage VDD, and may boost the received power supply voltage VDD to a predetermined voltage based on the PWM control signal before supplying it to the backlight 920. Accordingly, the backlight 920 may be lighted with a predetermined brightness. More particularly, brightness of the backlight 920 may be relatively lower when a boosted voltage is relatively low, and brightness of the backlight 920 may be relatively higher when the boosted voltage is relatively high.

In some embodiments, the current detector 913 may include resistor(s), diode(s), storage capacitor(s), etc., and may reduce a current received from the backlight 920 to a predetermined level before supplying the reduced current to the PWM controller 911. Hence, the PWM controller 911 may effectively control brightness of the backlight 920 based on the sensed ambient brightness.

Accordingly, in embodiments of the invention, when ambient light is dark, the backlight 920 may be lighted with a relatively low brightness such that screen brightness of the liquid crystal display panel 950 may be relatively reduced. Further, according to the present invention, when ambient light is bright, the backlight 920 may be lighted with a relatively high brightness such that screen brightness of the liquid crystal display panel 950 may be relatively increased. Thus, embodiments of the invention may provide a flat panel display in which screen brightness may be automatically adjusted based on sensed ambient light.

Ambient light sensing circuits and flat panel displays employing one or more aspects of the invention may output voltages of various levels based on sensed ambient light. For example, screen brightness of flat panel displays employing such an ambient light sensing circuit may be automatically adjusted using the respective corresponding output voltage such that visibility of the flat panel display may be improved regardless of whether it is positioned in a bright place or a dark place.

Flat panel displays including an ambient light sensing circuit according to one or more aspects of the invention may automatically adjust power consumption based on sensed ambient light, and optimum power consumption may be maintained such that a usable time, e.g., a battery life, of a portable flat panel display may be extended.

An ambient light sensing circuit according to embodiments of the invention may be formed on a same or a different substrate as that on which, e.g., an ambient light control processor, a timing controller, a data driver, a light emission control driver, a power supply controller, a buffer, a gate driver, and/or an organic light emitting display panel is/are formed.

In some embodiments of the invention, a flat panel display may include an ambient light sensing circuit, an ambient light control processor, a timing controller, a data driver and an organic light emitting display panel formed on a same substrate using, e.g., a low temperature polycrystalline silicon thin film transistor process such that a thickness of the flat panel display may be further reduced.

In some embodiments of the invention, a flat panel display may include an ambient light sensing circuit, an ambient light control processor, a timing controller, a light emission control driver, and an organic light emitting display panel formed on one substrate, e.g., using a low temperature polycrystalline silicon thin film transistor process, such that a thickness of the flat panel display may be further reduced.

In some embodiments of the invention, a flat panel display may include an ambient light sensing circuit, an ambient light control processor, a timing controller, a light emission control driver, a power supply controller, and an organic light emitting display panel formed on one substrate, e.g., using a low temperature polycrystalline silicon thin film transistor process, such that a thickness of the flat panel display may be further reduced.

In some embodiments of the invention, a flat panel display may include an ambient light sensing circuit, an ambient light control processor, a timing controller, a buffer, a gate driver, a data driver, and a liquid crystal display panel formed on one substrate, e.g., using a low temperature polycrystalline silicon thin film transistor process, such that a thickness of the flat panel display may be further reduced.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is clamed is:

1. An ambient light sensing circuit adapted to be electrically coupled to a first power supply for supplying a first power supply voltage and an output load coupled to a storage capacitor, the ambient light sensing circuit comprising:
   a transistor;
   a first storage capacitor coupled to the transistor and adapted to compensate for a threshold voltage of the transistor;
   a second storage capacitor coupled to the first storage capacitor;
   a photodiode coupled to the first storage capacitor and the second storage capacitor, the photodiode being adapted to change a coupling voltage of the first storage capacitor and the second storage capacitor based on ambient light incident thereon;
   a first switch adapted to selectively apply the first power supply voltage to the output load coupled to the transistor;
   a second switch including a first electrode coupled to a first electrode of the transistor, and a second electrode coupled to the output load and a first electrode of the first switch, the second switch being adapted to allow a charge stored in the storage capacitor to be discharged through the transistor based on the coupling voltage of the first storage capacitor and the second storage capacitor; and
   a third storage capacitor coupled to the photodiode and adapted to increase an inverse bias potential of the photodiode.

2. The ambient light sensing circuit as claimed in claim 1, further comprising a sixth switch coupled to a second electrode of the transistor and adapted to allow the storage capacitor coupled to the output load to be at least partially discharged to a second power supply based on the coupling voltage of the first storage capacitor and the second storage capacitor.

3. The ambient light sensing circuit as claimed in claim 1, further comprising a seventh switch arranged between the third storage capacitor and the photodiode and adapted to couple the third storage capacitor to the photodiode in parallel.

4. The ambient light sensing circuit as claimed in claim 1, wherein the photodiode is one of a PIN diode, a PN diode, and a photo coupler, in which a cathode thereof is coupled to a reference power supply and an anode thereof is coupled to a second power supply.

5. The ambient light sensing circuit as claimed in claim 1, wherein the photodiode is one of a PIN diode, a PN diode, and a photo coupler, in which a cathode thereof is coupled to a second power supply and an anode thereof is coupled to a reference power supply.

6. The ambient light sensing circuit as claimed in claim 1, wherein the storage capacitor coupled to the output load is a parasitic wire capacitance.

7. The ambient light sensing circuit as claimed in claim 1, further comprising:
   a third switch including a first electrode coupled to a first electrode of the first storage capacitor and adapted to controllably supply a reference voltage to the first storage capacitor; and
   a fourth switch coupled to a second electrode of the first storage capacitor and between a control electrode of the transistor and a second electrode of the transistor, and adapted to allow an adjusted reference voltage based on the threshold voltage of the transistor to be applied to the second electrode of the first storage capacitor and to selectively connect the transistor in a diode-coupled state.

8. The ambient light sensing circuit as claimed in claim 7, further comprising a fifth switch coupled to the first electrode of the transistor and adapted to supply a reference voltage to the transistor, wherein the adjusted reference voltage is based on the reference voltage supplied via the fifth switch and the threshold voltage of the transistor.

9. The ambient light sensing circuit as claimed in claim 1, wherein the first electrode of the transistor is coupled to an ambient light control processor.

10. The ambient light sensing circuit as claimed in claim 9, wherein the ambient light control processor includes:
    an analog-digital converter that is electrically coupled with the first electrode of the transistor;
    a first memory that is electrically coupled with the analog-digital converter and stores a digital value in accordance with present ambient light;
    a controller that is electrically coupled with the first memory and calculates and outputs brightness of the present ambient light; and
    a second memory that is electrically coupled with the controller and has predetermined digital values corresponding to ambient light of various brightness levels stored therein.

11. The ambient light sensing circuit as claimed in claim 10, wherein the analog-digital converter comprises:
    the output load coupled to the transistor, and
    the storage capacitor coupled to the output load, wherein the storage capacitor is coupled between the output load and the second power supply.

12. A flat panel display, comprising:
    an ambient light sensing circuit adapted to be electrically coupled to a first power supply for supplying a first power supply voltage and an output load coupled to a storage capacitor, the ambient light sensing circuit including:
    a transistor;
    a first storage capacitor coupled to the transistor and adapted to compensate for a threshold voltage of the transistor;
    a second storage capacitor coupled to the first storage capacitor;
    a photodiode coupled to the first storage capacitor and the second storage capacitor, and adapted to change a coupling voltage of the first storage capacitor and the second storage capacitor based on ambient light incident thereon;
    a first switch adapted to selectively apply the first power supply voltage to the output load coupled to the transistor; and
    a second switch including a first electrode coupled to a first electrode of the transistor, and a second electrode coupled to the output load and a first electrode of the first switch, the second switch being adapted to allow a charge stored in the storage capacitor to be discharged through the transistor based on the coupling voltage of the first storage capacitor and the second storage capacitor;

an ambient light control processor coupled to the second electrode of the second switch of the ambient light sensing circuit, and adapted to calculate an amount of present ambient light based on an analog signal supplied from the first electrode of the transistor and to output a digital value corresponding to the amount of present ambient light; and a timing controller that outputs a control corresponding to the present ambient light based on the digital value output by the ambient light control processor.

13. The flat panel display as claimed in claim 12, wherein the timing controller comprises:

a lookup table including predetermined digital values corresponding to ambient light of various brightness levels stored therein; and a brightness selector that compares the digital value output by the ambient light control processor with the predetermined digital values stored in the lookup table, selects a control signal corresponding to the present ambient light, and outputs the control signal corresponding to the present ambient light.

14. The flat panel display as claimed in claim 12, further comprising:

a power supply controller that outputs a power supply voltage corresponding to the present ambient light based on the control signal output by the timing controller; and an organic light emitting display panel that emits light based on the power supply voltage output by the power supply controller.

15. The flat panel display as claimed in claim 12, further comprising:

a buffer that boosts and outputs a power supply voltage corresponding to the present ambient light based on the control signal output by the timing controller;

a backlight that is lighted by a voltage supplied from the buffer; and a liquid crystal display panel that displays an image using light emitted from the backlight.

16. The flat panel display as claimed in claim 12, further comprising:

a data driver that outputs a data signal corresponding to the present ambient light based on the control signal output by the timing controller; and an organic light emitting display panel that emits light based on the data signal output by the data driver.

17. The flat panel display as claimed in claim 16, wherein the data signal output by the data driver is a data voltage that is proportional to the present ambient light sensed by the ambient light sensing circuit.

18. The flat panel display as claimed in claim 12, further comprising:

an emission control driver that outputs a light emission control signal corresponding to the present ambient light based on the control signal output by the timing controller; and an organic light emitting display panel that emits light based on the light emission control signal output by the light emission control driver.

19. The flat panel display as claimed in claim 18, wherein the light emission control signal output by the light emission control driver controls an on-time of a light emission control signal supplied to the organic light emitting display panel, and the on-time of the light emission control signal is proportional to the present ambient light sensed by the ambient light sensing circuit.

* * * * *